US012692192B2

(12) United States Patent
Purola et al.

(10) Patent No.: US 12,692,192 B2
(45) Date of Patent: Jul. 28, 2026

(54) METHOD AND APPARATUS FOR MANUFACTURING CEMENT USING ROTARY GENERATED THERMAL ENERGY

(71) Applicant: Coolbrook Oy, Helsinki (FI)

(72) Inventors: Veli Matti Purola, Helsinki (FI); Tuomas Ouni, Helsinki (FI)

(73) Assignee: COOLBROOK OY, Helsinki (FI)

( * ) Notice: Subject to any disclaimer, the term of this patent is extended or adjusted under 35 U.S.C. 154(b) by 788 days.

(21) Appl. No.: 18/046,317

(22) Filed: Oct. 13, 2022

(65) Prior Publication Data

US 2023/0110304 A1 Apr. 13, 2023

Related U.S. Application Data

(60) Provisional application No. 63/255,433, filed on Oct. 13, 2021.

(51) Int. Cl.
*C04B 7/36* (2006.01)
*B28B 11/24* (2006.01)
(Continued)

(52) U.S. Cl.
CPC ............ *C04B 7/432* (2013.01); *B28B 11/243* (2013.01); *C01B 3/24* (2013.01); *C01B 32/16* (2017.08);
(Continued)

(58) Field of Classification Search
CPC .... C04B 7/36; C04B 7/43; C04B 9/20; F24V 40/00; F24V 30/00; F22B 3/06
See application file for complete search history.

(56) References Cited

U.S. PATENT DOCUMENTS 1,239,912 A * 9/1917 Andre ...................... C04B 7/36
423/493
4,614,229 A 9/1986 Oldweiler
(Continued)

FOREIGN PATENT DOCUMENTS

EP 10632373 A1 12/2000
EP 3249027 A1 11/2017
(Continued)

OTHER PUBLICATIONS

EIA_Industrial_facilities_get_most_of_their_electricity_from_the_ grid_2014.pdf (Year: 2014).*
(Continued)

*Primary Examiner* — Michael G Hoang
*Assistant Examiner* — Kurt J Wolford
(74) *Attorney, Agent, or Firm* — Eversheds Sutherland (US) LLP

(57) ABSTRACT

Methods for inputting thermal energy into fluidic medium in a cement manufacturing process include generation of a heated fluidic medium by at least one rotary apparatus having a rotor with at least one row of rotor blades and a stator configured as an assembly of stationary vanes arranged at least upstream of the at least one row of rotor blades. An amount of thermal energy is imparted to a stream of fluidic medium by virtue of a series of energy transformations occurring when the stream of fluidic medium passes through the stationary guide vanes and the at least one row of rotor blades, respectively. The method further includes integration of the at least one rotary apparatus into a cement production facility configured to carry out cement production processes, and conducting an amount of input energy into the at least one rotary apparatus integrated into the heat-consuming process facility.

41 Claims, 6 Drawing Sheets

(51) Int. Cl.

| | |
|---|---|
| *C01B 3/24* | (2006.01) |
| *C01B 32/16* | (2017.01) |
| *C03B 5/235* | (2006.01) |
| *C03B 37/022* | (2006.01) |
| *C03C 1/00* | (2006.01) |
| *C04B 7/42* | (2006.01) |
| *C04B 7/43* | (2006.01) |
| *C04B 7/47* | (2006.01) |
| *C04B 33/24* | (2006.01) |
| *C04B 33/32* | (2006.01) |
| *C10G 9/40* | (2006.01) |
| *C10G 11/20* | (2006.01) |
| *C10G 47/32* | (2006.01) |
| *C10G 47/36* | (2006.01) |
| *C21B 13/08* | (2006.01) |
| *D01F 9/22* | (2006.01) |
| *F22B 3/06* | (2006.01) |
| *F23G 7/06* | (2006.01) |
| *F24H 1/00* | (2022.01) |
| *F24V 30/00* | (2018.01) |
| *F24V 40/00* | (2018.01) |
| *F27B 7/20* | (2006.01) |
| *F27B 7/34* | (2006.01) |
| *F27B 9/10* | (2006.01) |
| *F28D 20/00* | (2006.01) |

(52) U.S. Cl.

CPC ............ *C03B 5/235* (2013.01); *C03B 37/022* (2013.01); *C03C 1/004* (2013.01); *C04B 7/367* (2013.01); *C04B 7/42* (2013.01); *C04B 7/475* (2013.01); *C04B 33/24* (2013.01); *C04B 33/32* (2013.01); *C10G 9/40* (2013.01); *C10G 11/20* (2013.01); *C10G 47/32* (2013.01); *C10G 47/36* (2013.01); *C21B 13/085* (2013.01); *D01F 9/22* (2013.01); *F22B 3/06* (2013.01); *F23G 7/061* (2013.01); *F24H 1/0018* (2013.01); *F24V 30/00* (2018.05); *F24V 40/00* (2018.05); *F27B 7/2016* (2013.01); *F27B 7/34* (2013.01); *F27B 9/10* (2013.01); *F28D 20/0056* (2013.01); *C01B 2203/0205* (2013.01); *C01B 2203/0833* (2013.01); *C01B 2203/1241* (2013.01); *C04B 2290/20* (2013.01); *C10G 2300/1033* (2013.01); *C10G 2300/4081* (2013.01); *C10G 2300/807* (2013.01); *F23G 2204/00* (2013.01); *F23G 2209/14* (2013.01); *F28D 2020/0013* (2013.01); *F28D 2020/0026* (2013.01); *F28D 2020/0047* (2013.01); *F28D 2020/006* (2013.01); *F28D 2020/0078* (2013.01)

(56) References Cited

U.S. PATENT DOCUMENTS

| | | | | |
|---|---|---|---|---|
| 9,494,038 | B2 * | 11/2016 | Bushuev | .............. B01J 19/0066 |
| 2006/0116543 | A1 | 6/2006 | Bellet et al. | |
| 2007/0007175 | A1 | 1/2007 | Strack et al. | |
| 2008/0128326 | A1 | 6/2008 | McCoy et al. | |
| 2011/0159449 | A1 | 6/2011 | Salmento | |
| 2012/0024749 | A1 | 2/2012 | Strack et al. | |
| 2014/0243569 | A1 | 8/2014 | Seppala et al. | |
| 2019/0284485 | A1 | 9/2019 | Willigenburg | |
| 2020/0114332 | A1 * | 4/2020 | Xu | ........................ C10G 11/00 |
| 2020/0290939 | A1 | 9/2020 | Willigenburg | |
| 2021/0171836 | A1 | 6/2021 | Purola | |

FOREIGN PATENT DOCUMENTS

| | | | |
|---|---|---|---|
| EP | 3415587 | A1 | 12/2018 |
| EP | 3725865 | A1 | 10/2020 |
| EP | 3 865 801 | A1 | 8/2021 |
| JP | S58-213087 | A | 12/1983 |
| JP | 2003504485 | A | 2/2003 |
| WO | 2017125833 | A1 | 7/2017 |

OTHER PUBLICATIONS

Grid_Fabric_The_power_grid_101_2020.pdf (Year: 2020).*
1 International Search Report and Written Opinion, PCT/FI2021/050683, dated Jan. 19, 2023 (13 pp.).
Extended European Search Report, EP 22880467.0, dated Jul. 30, 2025 (10 pp.).

* cited by examiner

1000

METHOD AND APPARATUS FOR MANUFACTURING CEMENT USING ROTARY GENERATED THERMAL ENERGY

CROSS-REFERENCE TO RELATED APPLICATION

This application claims priority to U.S. Provisional Patent Application No. 63/255,433, filed Oct. 13, 2021, which is incorporated herein by reference.

FIELD OF THE INVENTION

The present invention generally relates to systems and methods for inputting thermal energy (heat) into fluids. In particular, the invention relates to tools and processes for optimizing energy efficiency and reducing greenhouse gas and particle emissions in heat-consuming industrial processes related to cement production carried out at high and extremely high temperatures.

BACKGROUND

Industry and governments have been combating to find technologies to achieve significant reductions in greenhouse gas (GHG) emission reduction. Heavy industrial processes such as cement production, have a key role to reach low emission targets set by companies, governments and international organizations. Nevertheless, the core processes to transform limestone to cement clinker are heat consuming and proceed at very high temperatures, such as within a range of about 850 to 1600 degrees Celsius (° C.), which are currently achievable mainly by burning fossil-derived fuels.

The process of cement manufacturing generally proceeds along the following stages. At first, the raw cement ingredients needed for cement production, such as limestone ($CaCO_3$), sand and clay (silicon, aluminium, iron), are obtained by crushing and further size-reducing of ore rocks. Crushed raw ingredients are combined with additives and further grinded to produce a fine homogenous mixture. Generally, limestone is 80-85% and remaining is the clay. In a cement plant, the raw mix is dried (moisture content reduced to less than 1%) and blended into a fine powder to be stored in silos. Prior to be sent into a kiln, the raw materials undergo preheating in a preheater, consisting of a series of cyclones, for example. The preheater is typically fitted with a pre-calciner fired with petroleum, natural gas, coal or petroleum coke (petcoke). Also various waste streams and biomass materials can be used as a fuel.

The kiln phase is the principal stage of the cement production process. Here, a "cement clinker" or simply clinker is produced from the raw mix through a series of chemical reactions between calcium and silicon dioxide compounds. Clinker is typically produced in the kiln system at charge temperatures of between 1450-1500° C. and gas temperatures of about 2000° C. Thus, the high temperature process characteristic of the production of cement is often referred to as "burning clinker." In clinker burning, the raw material fed into the kiln system is dried, pre-heated, calcined and sintered to produce the cement clinker. The latter presents as a plurality of lumps or nodules 2-30 mm in diameter.

After exiting the kiln, the clinker is rapidly cooled down to about 100-200° C., and different additives, such as for example gypsum, some organic substances, etc. are added to the clinker. The clinker (with additives) is further transferred to a (cement) mill and ground into a fine powder thereby forming the finished cement powder product, commonly referred to as "cement".

All stages of cement production are associated with carbon dioxide emissions, with the kiln phase and the preceding pre-calciner phase being the most emissive intensive. In fact, majority of emissions arise from the pre-calciner, where most of the fuel is burnt and where carbon dioxide ($CO_2$) is released from calcium carbonate ($CaCO_3$, limestone). In addition, conventional rotary kilns are sources of NOx emissions due high temperature. $CO_2$ emissions are hard to avoid: 60% are an unavoidable result of the production process chemistry, and the remaining arise from the high-temperature process requirements. Although cement industry uses a range of fuels, the large majority (about 54%) of fuels is coal or petcoke, which are suitable for very high temperatures, but are highly emission intensive. Additionally, these fuels are a source of hazardous and toxic chemicals, and species measures must be undertaken to avoid their release to the atmosphere. Several methods have been proposed to reduce emissions in cement industry, for example increasing energy efficiency through pre-calciners, preheating, waste heat recovery, and other techniques.

Electrification of industrial processes has been seen as a solution to reduce emissions. However, high temperatures required for cement production represent the main reason that restrain electrification of these processes. Although considered a suitable solution to reduce GHG emissions, electrification of the industrial processes remains hindered due to inability of current technologies and existing facility infrastructures to fulfil the needs in achieving sufficiently high temperatures.

A number of rotary solutions have been proposed for heating purposes. Thus, U.S. Pat. No. 11,098,725 B2 (Sanger et al) discloses a hydrodynamic heater pump device operable to selectively generate a stream of heated fluid and/or pressurized fluid. A mentioned hydrodynamic heater pump is designed to be incorporated in an automotive vehicle cooling system to provide heat for warming a passenger compartment of the vehicle and to provide other capabilities, such as window deicing and engine cooling. The disclosed device may also provide a stream of pressurized fluid for cooling an engine. Disclosed technology is based on friction; and, since the fluid to be heated is liquid, the presented design is not suitable for conditions involving extreme turbulence of gas aerodynamics.

U.S. Pat. No. 7,614,367 B1 (Frick) discloses a system and method for flamelessly heating, concentrating or evaporating a fluid by converting rotary kinetic energy into heat. Configured for fluid heating, the system may comprise a rotary kinetic energy generator, a rotary heating device, and a primary heat exchanger, all in closed-loop fluid communication. The rotary heating device may be a water brake dynamometer. The document discloses the use of the system for heating water in offshore drilling or production platforms. However, the presented system is not suitable for heating gaseous media, neither is it feasible for use with high and extremely high temperatures (due to liquid stability, vapor pressure, etc.).

Additionally, some rotary turbomachine-type devices are known to implement the processes of hydrocarbon (steam) cracking and aim at maximizing the yields of the target products, such as ethylene and propylene.

In this regard, an update in the field of technology related to design and manufacturing of efficient heating systems, in particular those suitable for high and extremely high temperature related applications, is still desired, in view of addressing challenges associated with raising temperatures of fluidic substances in efficient and environmentally friendly manner.

SUMMARY OF THE INVENTION

An objective of the present invention is to solve or to at least mitigate at least some of the problems arising from the limitations and disadvantages of the related art. One or more objectives are achieved by various embodiments of the methods for generation of a heated fluidic medium described herein, the rotary apparatuses and related uses as defined herein.

In an aspect, a method for cement production comprises generation of a heated fluidic medium by at least one rotary apparatus integrated into a cement production facility.

According to an embodiment, a method for cement production, which comprises generation of a heated fluidic medium by at least one rotary apparatus integrated into a cement production facility, improves energy efficiency or reduces greenhouse gas and particle emissions, or both.

In embodiments, the method for cement production comprises generation of a heated fluidic medium by at least one rotary apparatus integrated into a cement production facility, the at least one rotary apparatus comprising: a casing with at least one inlet and at least one exit, a rotor comprising at least one row of rotor blades arranged over a circumference of a rotor hub mounted onto a rotor shaft, and a plurality of stationary vanes arranged into an assembly at least upstream of the at least one row of rotor blades, wherein an amount of thermal energy is imparted to a stream of fluidic medium directed along a flow path formed inside the casing between the inlet and the exit by virtue of a series of energy transformations occurring when said stream of fluidic medium passes through the stationary vanes and the at least one row of rotor blades, respectively, whereby a stream of heated fluidic medium is generated, the method further comprises: conducting an amount of input energy into the at least one rotary apparatus integrated into the cement production facility, the input energy comprising electrical energy, supplying the stream of heated fluidic medium generated by the at least one rotary apparatus into the cement production facility, and operating said at least one rotary apparatus and said cement production facility to carry out cement production at temperatures essentially equal to or exceeding about 500 degrees Celsius (° C.).

In another aspect, a method is provided for inputting thermal energy into fluidic medium during cement production.

In an embodiment, the method comprises inputting thermal energy into a process or processes related to producing cement in a cement production facility, the method comprises generation of a heated fluidic medium by at least one rotary apparatus integrated into the cement production facility, the at least one rotary apparatus comprising: a casing with at least one inlet and at least one exit, a rotor comprising at least one row of rotor blades arranged over a circumference of a rotor hub mounted onto a rotor shaft, and a plurality of stationary vanes arranged into an assembly at least upstream of the at least one row of rotor blades, the method further comprises: integrating the at least one rotary apparatus into the cement production facility configured to carry out process or processes related to production of cement at temperatures essentially equal to or exceeding about 500 degrees Celsius (° C.), conducting an amount of input energy into the at least one rotary apparatus integrated into the cement production facility, the input energy comprising electrical energy, and operating the at least one rotary apparatus integrated into the cement production facility such, that an amount of thermal energy is imparted to a stream of fluidic medium directed along a flow path formed inside the casing between the inlet and the exit by virtue of a series of energy transformations occurring when said stream of fluidic medium passes through the stationary vanes and the at least one row of rotor blades, respectively, whereby a stream of heated fluidic medium is generated.

In embodiments, the method comprises operating the at least one rotary apparatus operatively connected to and/or integrated into at least one heat-consuming unit within the cement production facility. In an embodiment, the at least one heat-consuming unit is configured to carry out a process or processes related to cement production.

In embodiments, the method comprises operating the at least one rotary apparatus operatively connected to and/or integrated into at least one heat-consuming unit within the cement production facility, the at least one heat-consuming unit being configured as any one of: (i) a clinkerization unit configured for thermal conversion of cement raw materials into cement clinker, (ii) a heater and/or a dryer configured for heating and/or drying a cement raw material, a cement clinker and/or a cement product, (iii) a mixer and/or a homogenizer configured to act on any one of a cement raw material, a cement clinker and/or a cement product, (iv) post-clinkerization processing unit(s) configured for cooling cement clinker and/or for formation of a cement product, (v) a mill configured for drying and grinding solid fuels, such as petroleum coke and/or coal, or (vi) any combination thereof.

In an embodiment, the method comprises operating the at least one rotary apparatus operatively connected to at least one kiln configured to thermally convert cement raw materials into cement clinker. In embodiments, the method comprises operating the at least one rotary apparatus operatively connected to any one of: a burner, a heater, a furnace, an oven, a mill, a dryer, a reactor, an incinerator, a combustion chamber, a boiler, a conveyor device, or a combination thereof.

In an embodiment, the method comprises generation of the fluidic medium heated to the temperature essentially equal to or exceeding about 500 degrees Celsius (° C.), or to the temperature essentially equal to or exceeding about 1200° C., or to the temperature essentially equal to or exceeding about 1700° C.

In an embodiment, the method comprises adjusting velocity and/or pressure of the stream of fluidic medium propagating through the rotary apparatus, to produce conditions, the stream of the heated fluidic medium is generated.

In embodiments, in said method, the heated fluidic medium is generated by the at least one rotary apparatus comprising two or more rows of rotor blades sequentially arranged along the rotor shaft.

In an embodiment, in said method, the heated fluidic medium is generated by the at least one rotary apparatus further comprising a diffuser area arranged downstream of the at least one row of rotor blades, the method furthers comprises operating the at least one rotary apparatus integrated into the cement production facility such, that an amount of thermal energy is imparted to a stream of fluidic medium directed along a flow path formed inside the casing between the inlet and the exit by virtue of a series of energy transformations occurring when said stream of fluidic medium successively passes through the stationary guide vanes, the at least one row of rotor blades and the diffuser area, respectively, whereby a stream of heated fluidic medium is generated. The diffuser area may be configured with or without stationary vanes.

In embodiment, in said method, the amount of thermal energy added to the stream of fluidic medium propagating through the rotary apparatus is controlled by adjusting the amount of input energy conducted into the at least one rotary apparatus integrated into the cement production facility.

In an embodiment, the method further comprises arranging an additional heating apparatus downstream of the at least one rotary apparatus and introducing a reactive compound or a mixture of reactive compounds to the stream of fluidic medium propagating through said additional heating apparatus, whereupon the amount of thermal energy is added to said stream of fluidic medium through exothermic reaction(s). In an embodiment, the reactive compound or the mixture of reactive compounds is introduced to the stream of fluidic medium preheated to a predetermined temperature. In an embodiment, the reactive compound or the mixture of reactive compounds is introduced to the stream of fluidic medium preheated to a temperature essentially equal to or exceeding about 1700° C. In an embodiment, preheating of the stream of fluidic medium to the predetermined temperature is implemented in the rotary apparatus.

In an embodiment, the method comprises generation of the heated fluidic medium by at least two rotary apparatuses integrated into the cement production facility, wherein the at least two rotary apparatuses are connected in parallel or in series. In embodiments, the method comprises generation of the heated fluidic medium by at least two sequentially connected rotary apparatuses, wherein the stream of fluidic medium is preheated to a predetermined temperature in at least a first rotary apparatus in a sequence, and wherein said stream of fluidic medium is further heated in at least a second rotary apparatus in the sequence by inputting an additional amount of thermal energy into the stream of preheated fluidic medium propagating through said second rotary apparatus. In an embodiment, in said method, in at least the first rotary apparatus in the sequence, the stream of fluidic medium is preheated to a temperature essentially equal to or exceeding about 1700° C. In an embodiment, in said method, the additional amount of thermal energy is added to the stream of fluidic medium propagating through said at least second rotary apparatus in the sequence by virtue of introducing the reactive compound or the mixture of reactive compounds into said stream. In an embodiment, the method comprises introducing the reactive compound or a mixture of reactive compounds into a process or processes related to the production of cement.

In an embodiment, in said method, the fluidic medium that enters the rotary apparatus is an essentially gaseous medium.

In an embodiment, the method comprises generation of the heated fluidic medium in the rotary apparatus. In embodiments, in said method, the heated fluidic medium generated in the rotary apparatus comprises any one of: air, steam ($H_2O$), nitrogen ($N_2$), hydrogen ($H_2$), carbon dioxide ($CO_2$), carbon monoxide (CO), methane ($CH_4$), or any combination thereof. Any other gas can be utilized where appropriate. In an embodiment, the heated fluidic medium generated in the rotary apparatus is a recycle gas recycled from exhaust gases generated in the process or processes related to production of cement.

In an embodiment, the method further comprises generation of the heated fluidic medium, such as gas, vapor, liquid, and mixtures thereof, and/or heated solid materials outside the rotary apparatus through a process of heat transfer between the heated fluidic medium generated in the rotary apparatus and any one of the above-mentioned substances bypassing the rotary apparatus.

In embodiments, in said method, the heated fluidic medium generated by the at least one rotary apparatus or in the at least one rotary apparatus is supplied into at least one heat-consuming unit within the cement production facility, the heat-consuming unit provided as any one of: (i) a clinkerization unit configured for thermal conversion of cement raw materials into cement clinker, (ii) a heater and/or a dryer configured for heating and/or drying a cement raw material, a cement clinker and/or a cement product, (iii) a mixer and/or a homogenizer configured to act on any one of a cement raw material, a cement clinker and/or a cement product, (iv) post-clinkerization processing unit(s) configured for cooling cement clinker and/or for formation of a cement product, (v) a mill configured for drying and grinding solid fuels, such as petroleum coke and/or coal, or (vi) any combination thereof.

In embodiments, in said method, the heated fluidic medium generated by the at least one rotary apparatus or in the at least one the rotary apparatus is further supplied into at least one heat-consuming unit within the cement production facility, the at least one heat-consuming unit being provided as any one of: a burner, a heater, a furnace, an oven, a mill, a dryer, a reactor, an incinerator, a combustion chamber, a boiler, a conveyor device, or a combination thereof.

In an embodiment, the method further comprises increasing pressure in the stream of fluidic medium propagating through the rotary apparatus.

In an embodiment, in said method, the amount of electrical energy conducted as the input energy into the at least one rotary apparatus integrated in the cement production facility is within a range of about 5 percent to 100 percent.

In embodiment, in said method, the amount of electrical energy conducted as the input energy into the at least one rotary apparatus integrated in the cement production facility is obtainable from a source of renewable energy or a combination of different sources of energy, optionally, renewable energy.

In embodiment, in said method, the at least one rotary apparatus is utilized to balance variations, such as oversupply and shortage, in the amount of electrical energy (obtained through supply and/or production, for example), optionally renewable electrical energy, by virtue of being integrated, into the concrete production facility, together with an at least one non-electrical energy operable heater device.

In another aspect, a cement production facility is provided, said cement production facility comprising at least one rotary apparatus configured to generate a heated fluidic medium and at least one heat-consuming unit configured to carry out a process or processes related to cement production.

In an embodiment, in said cement production facility, the at least one rotary apparatus comprises a casing with at least one inlet and at least one exit, a rotor comprising at least one row of rotor blades arranged over a circumference of a rotor hub mounted onto a rotor shaft, and a plurality of stationary vanes arranged into an assembly at least upstream of the at least one row of rotor blades, wherein the at least one rotary apparatus is configured to operate such that an amount of thermal energy is imparted to a stream of fluidic medium directed along a flow path formed inside the casing between the inlet and the exit by virtue of a series of energy transformations occurring when said stream of fluidic medium passes through the stationary vanes and the at least one row of rotor blades, respectively, whereby a stream of heated fluidic medium is generated, and wherein said at least one rotary apparatus is configured to receive an amount of input energy, the input energy comprising electrical energy, and to generate a heated fluidic medium for inputting thermal energy into at least one heat-consuming unit configured to carry out a process or processes related to cement production at temperatures essentially equal to or exceeding about 500 degrees Celsius (° C.).

In embodiments, the at least one heat-consuming unit provided within said cement production facility is any one of: (i) a clinkerization unit configured for thermal conversion of cement raw materials into cement clinker, (ii) a heater and/or a dryer configured for heating and/or drying a cement raw material, a cement clinker and/or a cement product, (iii) a mixer and/or a homogenizer configured to act on any one of a cement raw material, a cement clinker and/or a cement product, (iv) post-clinkerization processing unit(s) configured for cooling cement clinker and/or for formation of a cement product, (v) a mill configured for drying and grinding solid fuels, such as petroleum coke and/or coal, or (vi) any combination thereof, and wherein the at least one rotary apparatus is connected to and/or integrated into any one of (i)-(vi).

In an embodiment, the at least one rotary apparatus is connected, within said cement production facility, to at least one kiln configured to convert cement raw materials into cement clinker. In embodiments, the at least one rotary apparatus is further connected, within said cement production facility, to any one of: a burner, a heater, a furnace, an oven, a mill, a dryer, a reactor, an incinerator, a combustion chamber, a boiler, a conveyor device, or a combination thereof.

In embodiments, in said cement production facility, the at least one rotary apparatus comprises two or more rows of rotor blades sequentially arranged along the rotor shaft. In an embodiment, stationary vanes arranged into the assembly upstream of the at least one row of rotor blades are configured as stationary guide vanes. In an embodiment, the at least one rotary apparatus further comprises a diffuser area arranged downstream of the at least one row of rotor blades. The diffuser area may be configured with or without stationary diffuser vanes. In some configurations, vaned diffuser may be implemented as a plurality of stationary vanes arranged into an assembly downstream of the at least one row of rotor blades.

In an embodiment, the at least one rotary apparatus provided within said cement production facility is further configured to increase pressure in the fluidic stream propagating therethrough.

In some configurations, the least one rotary apparatus provided within said cement production facility is configured to implement a fluidic flow, between the inlet and the exit, along a flow path established in accordance with any one of: an essentially helical trajectory formed within an essentially toroidal-shaped casing; an essentially helical trajectory formed within an essentially tubular casing, an essentially radial trajectory, and along the flow path established by virtue of the stream of fluidic medium in the form of two spirals rolled up into vortex rings of right and left directions.

In an embodiment, the cement production facility comprises at least two rotary apparatuses arranged into an assembly and connected in parallel or in series.

In a further aspect, an assembly is provided and comprises at least two rotary apparatuses according to some previous aspect, said rotary apparatuses being connected in parallel or in series.

In a further aspect, an arrangement is provided and comprises at least one rotary apparatus according to some previous aspect, said at least one rotary apparatus being connected to at least one heat-consuming unit.

In a further aspect, a cement production facility is provided and is configured to implement a cement production process through a method according to some previously defined aspects and embodiments; and it comprises at least one rotary apparatus according to some previous aspect.

The utility of the present invention arises from a variety of reasons depending on each particular embodiment thereof.

Overall, embodiments offer an electrified rotary fluid heater to provide high temperature fluids, such as gases, to be used in the production of cement instead of fuel-fired heaters, for example. The presented method enables inputting thermal energy into various process units involved in cement production and operating at high- and extremely high temperatures, such as temperatures generally exceeding 500° C. The invention offers apparatuses and methods for heating the fluidic substances to the temperatures within a range of about 500° C. to about 2000° C., i.e. the temperatures used in cement production.

Cement production typically employ utilities with high demand for thermal energy and hence, for heat consumption, such as fired heaters, for example. Said heat-consuming utilities are used to heat fluids to the temperatures needed for the cement production process. The invention presented herewith enables replacing conventional heat-consuming utilities, such as fuel fired heaters, by a rotary apparatus. In the method, the advantages accompanied by replacing fired heaters with the rotary apparatus include at least:

Support for electrified heating;

Elimination or at least significant reduction of greenhouse gas (such as NO, $CO_2$, CO, $NO_X$), other harmful components (such as for example HCl, $H_2S$, $SO_2$, and heavy metals) originating from fuels, particle emissions and soot emissions;

Reduced volume of a heater: the volume of the rotary apparatus is at least one order of magnitude smaller as compared to the volume of conventional process heaters or heat exchangers;

Improved safety in case of using flammable, hazardous fluids/gases;

Feasibility in handling large volumes of gases;

Absence of pressure drop;

Possibility of using the rotary (heater) apparatus also for compression of gases (a blower function);

Independency on temperature difference in direct heating of gases. Temperature rise in the rotary apparatus can be in range of about 10 to 1700° C. or more;

Possibility for using the rotary apparatus in indirect heating of fluids optionally by optimizing temperature difference in heat exchanger(s);

Possibility for at least partial recycling of hot process gases, thus improving and making simpler the heat recovery and improving energy efficiency;

Possibility for further raising the temperature of gases to be heated by adding reactive chemicals which further increase the gas temperature up to e.g. 2000° C. or higher by exothermic reactions.

In embodiments, the rotary apparatus can be used to replace conventional fired heaters or process furnaces for direct or indirect heating in cement production. Traditionally such heat has been mainly produced through burning of fossil fuels leading to significant $CO_2$ emissions. Replacing fossil fuels with wood or other bio-based materials has significant resource limitations and other significant environmental implications such as sustainable land use. With the increased cost-efficiency of renewable electricity, namely the rapid development of wind and solar power, it is possible to replace fossil fuel firing with the rotary apparatus powered with renewable electricity leading to significant greenhouse gas emission reductions. The rotary apparatus allows electrified heating of fluids to temperatures up to 1700° C. and higher. Such temperatures are difficult or impossible to reach with current electrical heating applications.

The rotary apparatus can be used for direct heating of process gases, inert gases, air or any other gases or for indirect heating of process fluids (liquid, vapor, gas, vapor/liquid mixtures etc.). Heated fluid generated in said rotary apparatus can be used for heating any one of gases, vapor, liquid, and solid materials. In particular, the rotary apparatus can be used for direct heating of recycled gas recycled from exhaust gases generated from the burning of cement clinker. The rotary apparatus can at least partly replace- or it can be combined with (e.g. as pre-heater) multiple types of furnaces, heaters, kilns, gasifiers, and reactors that are traditionally fired or heated with solid, liquid or gaseous fossil fuels or in some cases bio-based fuels, including rotary kilns used in cement production. Some other examples include, but are not limited to: blast furnaces, cupola furnaces, pot and tank furnaces, shaft furnaces, rotary kilns, multiple hearth furnaces, regenerative furnaces, steam boilers, catalytic reactors and fluidized bed kilns/reactors. Heated gases can be flammable, reactive, or inert and can be recycled back to the rotary apparatus. In addition to heating, the rotary apparatus may act as combined blower and heater allowing to increase pressure and to recycle gases.

Heated fluids, such as gases, can be used in a variety of applications. A heated object can be a solid material, liquid or gas, which gas further takes part in a number of reactions or is used as a heating media. Hence, hot gases can be used for heating solid materials in cement production factories.

The invention enables the reduction of greenhouse gas $(CO, CO_2, NO_x)$ and particle emissions when replacing fired heaters. By using the rotary apparatus, it is possible to have closed or semi-closed heating loops for processes, and to improve energy efficiency of the processes by reducing heat losses through flue gas. In conventional heaters, flue gases can be recycled only partly.

Additionally, the present solution enables improved optimization of the temperature difference(s) in the heat exchangers in indirect heating.

The invention further provides for flexibly using electrical energy, such as electrical energy obtainable from renewable sources. Production of renewable energy varies on daily basis and even on hourly basis. The invention allows for balancing renewable electricity production by integration of the rotary apparatus disclosed herewith with conventional fuel-operated (fuel-fired) heaters to provide heat to the cement production process, such as for example to the cement clinker burning process.

The invention further enables a reduction in the on-site investment costs as compared to traditional fossil fired furnaces.

The expression "a number of" refers hereby to any positive integer starting from one (1), e.g. to one, two, or three. The expression "a plurality of" refers hereby to any positive integer starting from two (2), e.g. to two, three, or four. The terms "first" and "second", are used hereby to merely distinguish an element from another element without indicating any particular order or importance, unless explicitly stated otherwise.

The term "gasified" is utilized hereby to indicate matter being converted into a gaseous form by any possible means.

Different embodiments of the present invention will become apparent by consideration of the detailed description and accompanying drawings.

DETAILED DESCRIPTION OF THE EMBODIMENTS

Detailed embodiments of the present invention are disclosed herein with the reference to accompanying drawings.

Figure 1A:
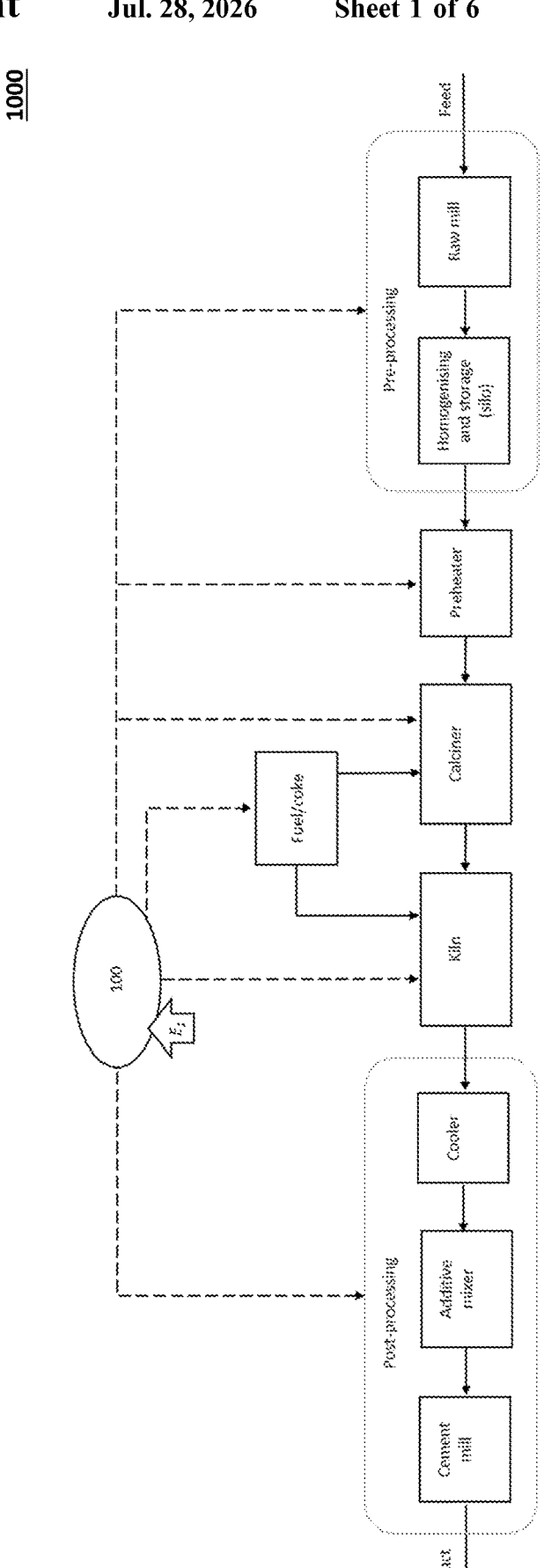
FIGS. 1A and 1B are blocks diagram representing, at 1000, a layout for a high temperature heat-consuming process facility provided as a cement manufacturing process facility configured to implement a method according to the embodiments.
Figure 1B:
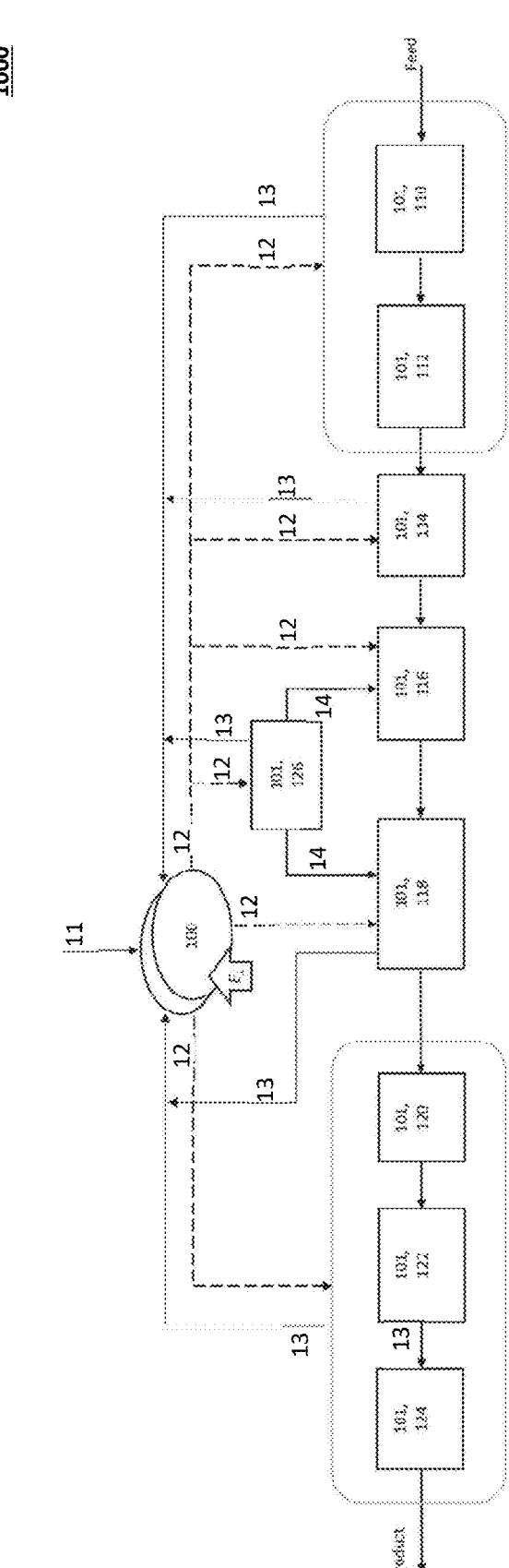

FIGS. 1A and 1B are block diagrams representing, at 1000, a layout for a high temperature cement manufacturing process facility configured to implement a method according to the embodiments. FIG. 2B and FIGS. 4A-4D describe apparatuses and methods according to the embodiments. FIG. 3 generally illustrates integration of apparatuses according to the embodiments into the high temperature cement manufacturing process facility 1000. Figures and related examples serve illustrative purposes and are not intended to limit applicability of the inventive concept to the layouts expressly presented in this disclosure. Block diagram sections shown by dotted lines are optional.

Cement manufacturing has high thermal (heat) energy demand and consumption and, in conventional solutions (viz. outside the heat integration scheme 1000 presented herewith), produce considerable industrial emissions such as carbon dioxide into the atmosphere. The present disclosure offers apparatuses and methods for inputting thermal energy into the cement manufacturing process or processes, whereby energy efficiency of said process can be markedly improved and/or the amount of air pollutants released into the atmosphere can be reduced. Layout 1000 (FIGS. 1A and 1B) schematically outlines these improved facility and method.

The heat-consuming process facility 1000 is a facility configured to carry out a heat-consuming industrial process or processes related to cement production at temperatures essentially equal to or exceeding 500 degrees Celsius (° C.). Facility 1000 can be represented with an industrial plant, a factory, or any industrial system comprising equipment designed to perform the above-mentioned heat-consuming industrial process(es) related to cement production.

In embodiments, facility 1000 is configured to carry out the heat-consuming industrial process(es) at temperatures within a range of 500-1700° C. In embodiments, facility 1000 is configured to carry out the heat-consuming industrial process(es) related to cement production which start at temperatures essentially within a range of about 800-900° C. or higher. In embodiments, facility 1000 is configured to carry out the heat-consuming industrial process(es) related to cement production at temperatures essentially equal to—or exceeding 1000° C. In embodiments, facility 1000 is configured to carry out the heat-consuming industrial process(es) related to cement production which start at temperatures essentially within a range of about 1100-1200° C. or higher. In embodiments, the facility is configured to carry out the heat-consuming industrial process(es) related to cement production at temperatures essentially equal to—or exceeding 1200° C. In embodiments, the facility is configured to carry out the heat-consuming industrial process(es) related to cement production at temperatures within a range of about 1300-1700° C. In embodiments, the facility is configured to carry out the heat-consuming industrial process(es) related to cement production at temperatures essentially equal to— or exceeding 1500° C. In embodiments, the facility is configured to carry out the heat-consuming industrial process(es) related to cement production at temperatures essentially equal to— or exceeding 1700° C. In some embodiments, the facility can be configured to carry out industrial process(es) related to cement production at temperatures that exceed 1700° C., such as at 2000° C. or higher, such as within a range of about 1700° C. to about 2500° C. The facility can be configured to carry out industrial process(es) related to cement production at about 1700° C., at about 1800° C., at about 1900° C., at about 2000° C., at about 2100° C., at about 2200° C., at about 2300° C., at about 2400° C., at about 2500° C., and at any temperature value falling in between the above-mentioned temperature points. It should be pointed out that facility 1000 is not excluded from carrying out of at least a part of industrial processes at temperatures below 500° C.

In industry, "cement" is combined with water and aggregates such as sand or stone to form "concrete." The production of cement is an energy demanding and high-temperature process, while the combination of cement with water and aggregates to form concrete is typically performed by simple mixing. If however, the production of "concrete" is considered to include the production of "cement," then that production process may include the high temperature processes described herein. Furthermore, cement production may also include the production of the raw materials or cement clinker precursor materials necessary in the production of cement clinker.

In the present disclosure, the term "cement" is used to generally denote a binding agent used in construction that sets and hardens to adhere to building units such as stones, bricks, tiles etc. On the other hand, the term "clinker" is used to denote a binder used in production of cement. Cement is produced by grinding the clinker (added with different active ingredients to achieve the desired properties of cement) into a fine powder in a cement mill, for example.

Compounds for cement clinker production comprise include one or more cement clinker precursor materials such as limestone, lime and a source of alkaline silicate, including but not limited to aluminosilicates, and silicate minerals such as clay, shale, impure limestone, or another material. Metal silicates, such as magnesium silicates, calcium silicates, sodium silicates, etc. can be utilized. Other materials included in the raw materials or reactive cement precursors may include a flux designed to enhance the sintering of the limestone and silicates. One common flux used in cement production is magnesium oxide, although aluminium oxide or iron oxide are also used. In other words, cement production may further include the formation of lime from limestone, or the formation of magnesium oxide from magnesium carbonate.

Lime is typically produced by calcination of calcium carbonate ($CaCO_3$, limestone) to calcium oxide (CaO, lime) and $CO_2$. Calcination of limestone proceeds at about 900-1200° C. Similarly, calcining of magnesium carbonate ($MgCO_3$) at temperatures typically in excess of 1000° C. yields magnesium oxide (MgO) and $CO_2$. Lime and magnesium oxide production are therefore high temperature processes that contribute to the overall production of $CO_2$ byproducts as a result of cement production.

Further description utilizes reference numbers as illustrated on FIGS. 1A and 1B unless otherwise explicitly noted. Heat-consuming industrial processes typically involved into cement production are verbally indicated in boxes shown on FIG. 1A and include, but are not limited with any one of: pre-clinkerization processing of cement raw materials/clinker precursors, such as crushing, grinding, homogenizing, and milling clinker precursor materials (rf. box "pre-processing", FIG. 1A), (pre)heating and (pre)calcination of clinker precursor materials, conversion of cement material into cement clinker (a process referred to as clinker burning) in the clinkerization system, such as a kiln system, including any one of drying, pre-heating, calcining and sintering of the raw materials fed into the kiln system; post-clinkerization processing of clinker to produce a cement product (rf. box "post-processing", FIG. 1A), and/or drying and grinding coal and/or petcoke used as a fuel for the kiln and calciner systems. The processes are collectively denoted on FIG. 1B with a reference numeral 101. Heat-consuming process unit(s)/utility(/ies) configured to carry out any one of the heat-consuming process or processes related to cement production, such as processes(es) indicated above, is/are also denoted with the same reference numeral (101), accordingly.

Since the cement production facility 1000 comprises a number of operational units 101 configured to perform same or different heat-consuming processes, the operational units 101 configured to perform different heat-consuming processes are additionally denoted with reference numbers 110-126 (FIG. 1B). In embodiments, each operational unit 101 comprises or consists of at least one heat-consuming device or a system configured to carry out a heat-consuming process.

In embodiment, the heat-consuming unit 101 is a clinkerization system configured to thermally convert cement raw materials into cement clinker. In embodiment, the clinkerization unit 118 is a kiln system, further referred as a "kiln" (118, FIG. 1B). In cement manufacturing process, there are two important chemical reactions: calcination of cement raw material (raw meal) at about 900° C. to 1050° C. and subsequent sintering to produce the cement clinker at about 1450-1500° C. Both these processes may be performed in the clinkerization unit 118. Alternatively, the clinkerization unit (kiln) 118 may be configured for the sintering phase, while the calcination process may take place in a (pre) calciner 116 in accordance with the following reaction (Equation 1):

$$CaCO_3(s) \rightarrow CaO(s) + CO_2(g), \Delta H_R = 3180 \text{ kJ/kg CaO at } 25° C.$$

The high temperature process characteristic of the production of cement includes heating a mixture of raw materials and/or one or more cement clinker precursor materials in a heat-consuming clinkerization unit. In the cement production facility, the clinkerization unit includes a sintering system, typically a (main) kiln system equipped with a (pre)calciner and/or a preheater. In the clinkerization unit, the cement raw materials/clinker precursors are thermally processed to form cement clinker. High temperature processes involved in cement production further include preprocessing of cement raw materials/clinker precursors prior the clinkerization phase, post-processing of the clinker exiting the clinkerization phase (e.g. cooling the clinker exiting the kiln followed with grinding/milling of a cement product in a cement mill, for example), and/or any other type of the high-temperature process utilized during cement production, e.g. coking of coal into coke, for example, the latter being used to produce fuel for the clinkerization 118 and the calciner 116 systems.

In embodiments, the method comprises generation of a heated fluidic medium such as air, steam, nitrogen ($N_2$), hydrogen ($H_2$), carbon dioxide, carbon monoxide, methane or any other (flue) gas, by virtue of a rotary heater unit 100 comprising or consisting of at least one rotary apparatus, hereafter, the apparatus 100. For the sake of clarity, the rotary heater unit is designated in the present disclosure by the same reference number, 100, as the rotary apparatus. The rotary heater unit is preferably integrated into the cement production facility 1000. In an embodiment, the heated fluidic medium is produced by the at least one rotary apparatus.

The rotary apparatus 100 can be provided as a standalone apparatus or as a number of apparatuses arranged in series (in sequence) or in parallel. One or more apparatuses may be connected to a common heat-consuming unit 101, such as the clinkerization unit/kiln 118 or calciner 116, for example. Connection may be direct or through a number of heat exchangers.

The heat-consuming unit(s)/utility(/ies) 101 for cement manufacture includes various kilns, furnaces, heaters, dryers, mixers, etc. In some configurations, a number of rotary apparatus units 100 can be connected to several heat-consuming utilities 101. Different configurations may be conceived, such as n+x rotary apparatuses connected to n utilities (e.g. furnaces), wherein n is equal to or more than zero (0) and x is equal to or more than one (1). Thus, in some configurations, the facility 1000 and, in particular, the rotary heater unit 100, may comprise one, two, three or four parallel rotary apparatus units connected to the common heat-consuming unit, such as a furnace, for example; the number of rotary apparatuses exceeding four (4) is not excluded. When connecting, in parallel, a number of rotary apparatuses to the common heat-consuming unit, one or more of said apparatuses 100 may have different type of drive engine, e.g. the electric motor driven reactor(s) can be combined with those driven by steam turbine, gas turbine and/or gas engine.

In an embodiment, an amount of input energy $E_1$ is conducted into the at least one rotary apparatus 100 integrated, as a (rotary) heater unit, into the process facility 1000. The input energy $E_1$ preferably comprises electrical energy. In embodiments, the amount of electrical energy conducted as the input energy into the at least one rotary apparatus integrated in the heat-consuming process facility is provided within a range of about 5 to about 100 percent, preferably, within a range of about 50 to about 100 percent. Thus, the amount of electrical energy conducted as the input energy into the at least one rotary apparatus integrated in the heat-consuming process facility can constitute any one of: 5, 10, 15, 20, 25, 30, 35, 40, 45, 50, 55, 60, 65, 70, 75, 80, 85, 90, 95, and 100 percent (from the total energy input), or any intermediate value falling in between the above indicated points.

Electrical energy can be supplied from external or internal source. In practice, electrical input energy E1 supplied into the apparatus can be defined in terms of electric power, the latter being defined as a rate of energy transfer per unit time (measured in Watt).

In embodiments, the heated fluidic medium generated in the rotary apparatus 100 is supplied into a process or processes related to producing cement in a cement production facility 1000 and implemented in heat-consuming units within the cement production facility. In embodiments, the heat-consuming process(es)/units 101 include, but are not limited with: a process for thermal conversion of cement raw materials into cement clinker implemented in a clinkerization unit/kiln (118); a process for (pre)calcination of cement raw materials(clinker precursors implemented in a (pre) calciner (116) and/or in a kiln (118), a process of heating and/or drying a cement raw material, a cement clinker and/or a cement product implemented in a heater and/or a dryer (110, 112, 114, 120, 122, 124), a process of mixing and/or homogenizing of a cement raw material, a cement clinker and/or a cement product implemented in a mixer and/or a homogenizer (110, 112, 114, 120, 122, 124), processes for cooling cement clinker and/or for formation of a cement product implemented in post-clinkerization processing unit(s), (120, 122, 124), a process of drying and grinding coal and/or petcoke implemented in a mill/a dryer (126), or any combination thereof.

Thermal energy inputted, with the heated fluidic medium generated in the rotary apparatus 100, into a variety of heat-consuming processes/units 101 within the cement production facility 1000 in indicated on FIG. 1A with dashed lines (see also ref no. 12, FIG. 1B).

Overall, the heat-consuming unit(s) 101 is/are provided as one or more kilns, burners, heaters, dryers, transporter and/or conveyor devices, mechanical processing devices (crushers, grinders, mills), mixing and/or homogenizing devices, furnaces, ovens, incinerators, combustion chambers, boilers, reactors, and/or other utilities adapted, alone or in combination, to implement processes related to manufacturing of cement, including those involved in manufacturing of cement clinker. In the layouts of FIGS. 1A and 1B, the fluid 11 (rf. FIG. 1B) heated in 100 transfers its thermal energy to a process fluid used in the heat-consuming unit/process 101 to provide heat of reaction to said process and/or to generate a heated fluidic medium. In such an event, the fluid 11 heated in 100 is different than the process fluid used in the heat-consuming unit/process 101. For the purposes of the invention the terms "process fluid", "process stream" or "process fluid stream" are used to indicate any one of gas, liquid, vapor, solid, including pelletized, granulized or powdered materials, or a mixture thereof. In cement manufacturing facility 1000, a gaseous fluidic medium 12 generated (heated) in the rotary apparatus 100 is used to heat primarily solid substances conveyed through the heat-consuming process units 101 (110-124) and/or substances indirectly involved into cement production (see coal/petcoke mill and dryer 126).

One embodiment for the rotary apparatus heating in cement production by burning clinker is shown in FIGS. 1A and 1B for a so-called dry process. In similar manner, the rotary apparatus can be used for other types of cement processes, such as in wet cement production. Typical cement production facility 1000 as depicted in FIGS. 1A and 1B comprises the heat consuming clinkerization unit 118 aiming at clinkerization of cement raw materials and collectively referred to as "kiln". It is noted that kiln system 118 may adopt any suitable configuration, including, but not limited a rotary kiln system, a static kiln system, as well as a fluidized bed kiln- or reactor system. Any other appropriate sintering arrangement may be utilized. Calciner 116 and a raw material preheater 114 may be provided as separate process units 101 (as shown on FIGS. 1A and 1B) or be included into the kiln system 118.

FIGS. 1A and 1B depict a number of main approaches for inputting the heated fluidic medium generated in the rotary apparatus 100 into the heat-consuming processes 101 within the cement production facility 1000. In similar manner, the heated fluidic flow generated in the apparatus 100 may be directed to any one of the processes 101 (110-126), although not explicitly described herein below.

In an embodiment, the rotary apparatus 100 is used to replace conventional hot gas generators used to dry raw materials and/or products outside the kiln system 118, i.e. in (pre) processing of raw materials, (post) processing of clinker/handling cements product(s), and/or in other processes, such as production of fuel/coke. In this embodiment, the rotary apparatus 100 is installed into an appropriate unit 101 and is utilized to produce hot fluidic medium 12, such as air, carbon dioxide or other flue gas, or a mixture thereof that is further supplied into the heat-consuming process. Exemplary processes include heating and drying of any one of a cement raw material, a cement clinker and/or a cement product implemented at any stage of the cement production process during pre- and post-clinkerization (110, 112, 114, 120, 122, 134, 126). By way of example, heating and/or drying of substances involved into cement production processes may be performed during grinding or milling in a raw mill (110) and/or in a cement mill (124), mixing, homogenizing, and storage (112), mixing in an additive mixer (122), drying raw materials in a coal/petcoke mill (126) optionally provided as a part of a separate coke plant, heating clinker precursors in a preheater (114), and/or drying clinker in a cooling unit (120).

Figure 2A:
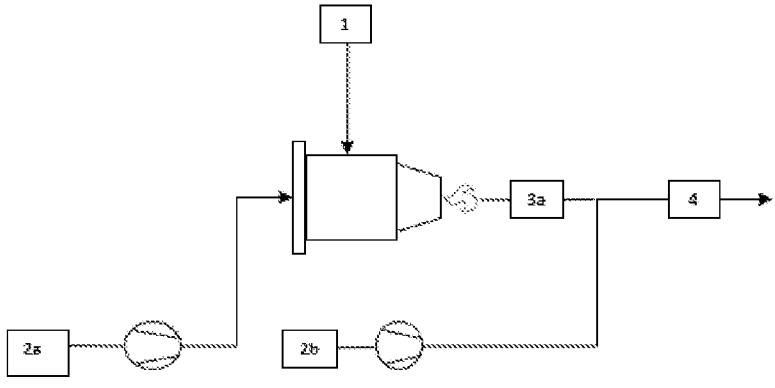
FIG. 2A schematically illustrates a conventional hot gas generator apparatus.
Figure 2B:
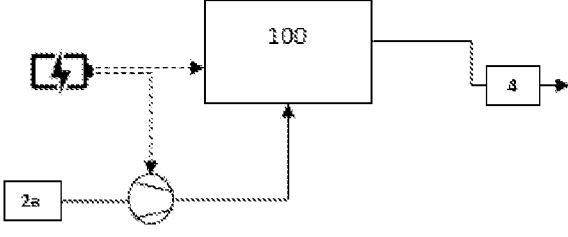
FIG. 2B illustrates generation of hot gases using the apparatus, according to the embodiments.
Figure 3:
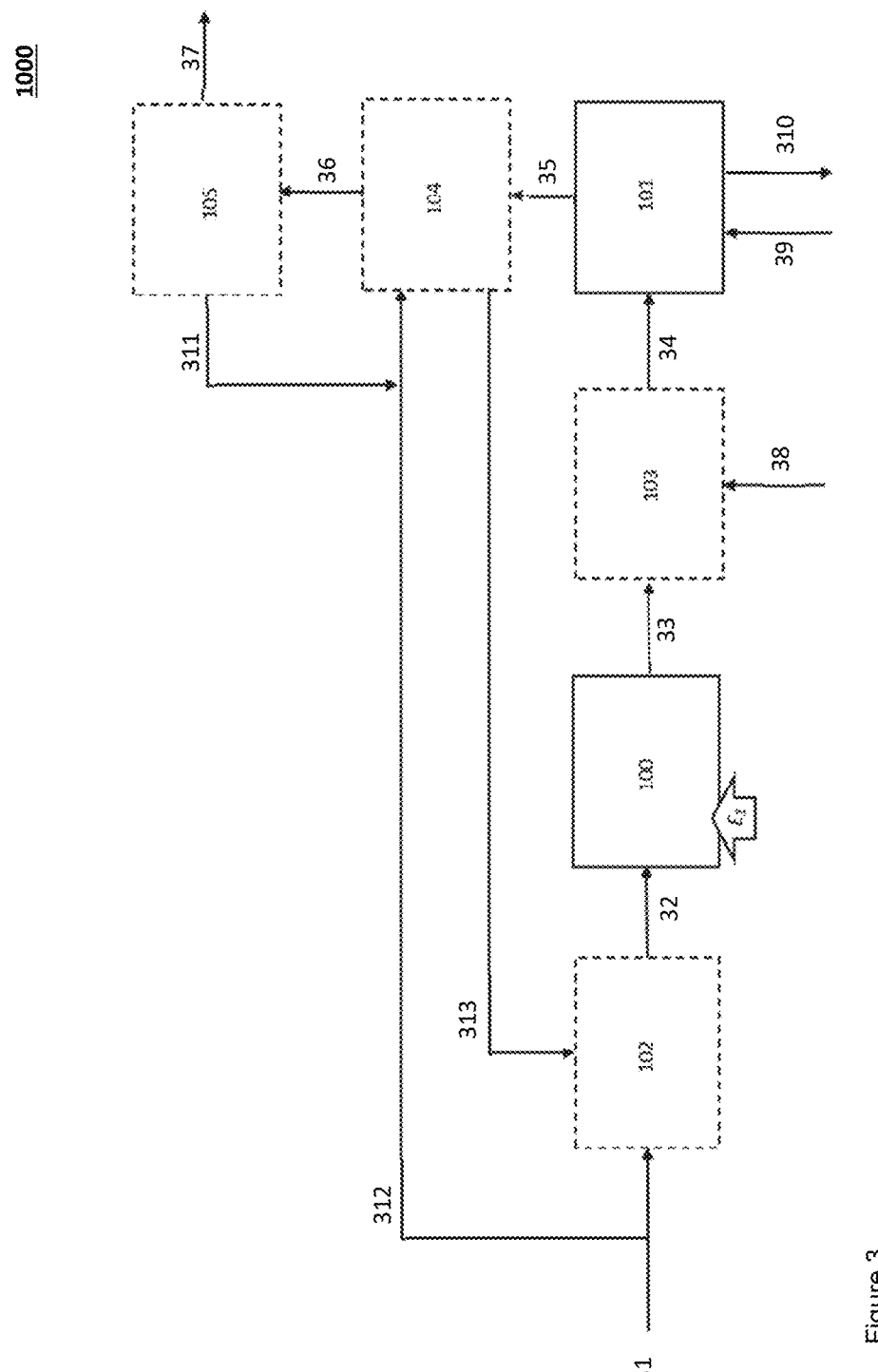
FIG. 3 is block diagram representing, at 1000, a layout for a high temperature heat-consuming process facility configured to implement a method according to the embodiments.

FIGS. 2A and 2B and Tables 1A and 1B below illustrate the benefits of installing the rotary apparatus 100 into the process unit 101 instead of a conventional hot gas generator device. FIG. 2A schematically illustrates a conventional gas combustion chamber operated with fossil fuel and used to burn fuel gases 1 in presence of air 2a to produce hot flue gases 3a, whose temperature is adjusted to a desired level with dilution air 2b for further use (stream 4). Table 1A shows flow- and process related parameters for the conventional hot gas generator of FIG. 2A.

FIG. 2B shows replacing the hot gas generation device with the rotary apparatus 100, according to the embodiments. Feed 2a is hereby an inert gas, such as air, nitrogen or water steam. Since fossil fuels are not utilized, the arrangement of FIG. 2B produces essentially no GHG emissions. For example, Table 1B shows that carbon dioxide is not formed. In similar manner, formation of $NO_x$ emissions can be avoided or significantly reduced (not shown). Gas heated in the apparatus 100 may be further directed, as stream 4, into any heat-consuming process 101 outlined on FIGS. 1A and 1B.

TABLE 1A

Generation of hot fluidic medium in a conventional fuel gas combustion chamber/hot gas generator (FIG. 2A).

|  |  | 1 | 2a | 2b | 3a | 4 |
|---|---|---|---|---|---|---|
| Flow | kg/h | 879 | 24806 | 34764 | 25685 | 60449 |
| Flow | m³/h | 1293 | 21097 | 29569 | 123646 | 163604 |
| Temperature | ° C. | 25 | 25 | 25 | 1346 | 659 |
| Components |  |  |  |  |  |  |
| $CO_2$ | kg/h |  |  |  | 2382 | 2382 |
| Nitrogen ($N_2$) | kg/h |  | 18834 | 26395 | 18834 | 45229 |
| Water | kg/h |  | 253 | 355 | 2148 | 2502 |
| Oxygen ($O_2$) | kg/h |  | 5719 | 8015 | 2321 | 10336 |
| Natural gas | kg/h | 879 |  |  |  |  |

TABLE 1B

Generation of hot fluidic medium in the rotary apparatus 100 (FIG. 2B).

|  |  | 2a | 4 |
|---|---|---|---|
| Flow | kg/h | 67262 | 67262 |
| Flow | m³/h | 58452 | 182737 |
| Temp | ° C. | 25 | 659 |
| Components |  |  |  |
| Nitrogen ($N_2$) | kg/h | 51052 | 51052 |
| Water | kg/h | 673 | 673 |
| Oxygen ($O_2$) | kg/h | 15538 | 15538 |

The rotary apparatus 100 can be further configured to provide a heat input to the (pre)calciner 116. The rotary apparatus(es) can replace fossil fuel-fired burners in the (pre)calciner unit. (Pre)calcining takes place before clinkerization 118, and about 60% of energy required for clinker production is consumed there. Energy is used to preheat the raw material and remove carbon dioxide from the limestone decomposed according to the Equation 1 presented hereinabove. Conventional (pre)calcination units utilize, in addition to fuel, also hot air (about 900° C.) recycled thereto from clinker cooling (rf. 120, FIG. 1B). The rotary apparatus 100 may be adapted to raise the temperature of the air flow in (pre)calcination, thus reducing an amount of fossil fuels required for the (pre)calcination.

The rotary apparatus 100 may be further adapted to provide heat input into the clinkerization unit 118, hereby the kiln. The apparatus 100 may be retrofitted to an in existing kiln setup to heat combustion air. The heated air (stream 12, FIG. 1B) produced by the apparatus 100 can be supplied into a main burner or burners of the kiln system. In such a manner, an amount of fossil fuels used to power the kiln burner(s) may be reduced. In some configurations, the rotary apparatus 100 may be configured to heat the combustion air to about 1500-1700° C., and an additional reactive chemical or a mixture of reactive chemicals may be added directly into the sintering process (118) to further raise the process temperature. In this manner, the temperature of flue gases discharged from kiln burner(s) may be raised up to 2200-2400° C. If for example, hydrogen is utilized as said additional reactive chemical, carbon dioxide emission in the clinkerization unit 118 may be significantly reduced. The clinkerization unit 118 may be configured as any alternative to traditional rotary kilns system, such as a fluidized bed kiln system for example.

Cement kilns produce cement by heating a mixture of limestone and clay to temperatures above 1450° C., during which limestone releases $CO_2$ and reacts into calcium oxide.

While the chemical reaction of limestone into calcium oxide is a major source of $CO_2$ emissions from cement manufacturing process, a large share of the emissions arises from the incineration of fossil fuels to reach to required high temperature. The rotary apparatus could be applied to partially or fully to replace fossil fuel incineration by providing hot air, nitrogen, steam or $CO_2$ to heat raw material.

In burning of cement clinker, it is necessary to maintain charge temperatures of up to 1450° C. in order to ensure the required sintering reactions to occur. In conventional heating process, this is achieved by heating combustion gases to about 2000° C. By means of the rotary apparatus 100, an additional amount of thermal energy may be generated to be used in the clinkerization process 118, so that less fossil fuel is needed to achieve required gas temperatures required maximum temperatures. Clinkerization process 118 process in conditions of excess of oxygen (typically 2-3%) in the combustion gases, since clinker needs to be burned under oxidizing conditions.

Clay is a common feedstock material used in cement manufacturing. Thermally or chemically activated clay improves reactivity of the cement product. However, when clay is mixed with cement raw materials (e.g. limestone), its thermal activation in the kiln system 118 may yield less reactive clay. In such an event, a separate clay activation kiln (not shown) can be used to optimize calcination conditions and to yield clay with improved (re)activity. Clay(s) having moisture content exceeding about 20% can be fed directly into the kiln system 118 configured as a rotary kiln, for example, where clay is dried, heated and activated at temperatures up to 900° C. using hot flue gases originated from burning fuels or hot gases generated with a gas generator device. The rotary apparatus 100 can be used to input heat into the kiln system 118 or to the clay activation kiln as described hereinabove, for example by replacing, fully or partly, hot gas generator(s) and/or burners of the kiln system.

The rotary apparatus 100 may be further adapted to provide heat input into a process of drying and grinding solid fuels, such as petroleum coke (petcoke) and/or coal, in the mill 126 configured as a coal mill/a petcoke mill. Petcoke is a by-product of the oil refining industry. In dried form, petcoke is used as a high-energy fuel in cement kiln systems 118 and (pre) calciners 116. In the mill 126, hot gas generator(s) are used to produce hot gas for drying grinded material for better pulverization. In embodiment, the rotary apparatus 100 is used to generate heated fluidic medium that can be further supplied into the mill 126, thus replacing the hot gas generator(s), as described hereinabove. Fluidic medium 11 such as for example air, nitrogen, steam, etc. heated in the rotary apparatus 100 is supplied, as stream 12, to the mill 126. Exhaust gas 13 from the mill 126 can be cooled in a heat exchanger (not shown) and recycled back to the rotary apparatus for optimal heat integration, as well as heat and energy recycling. Depending on the amount of exhaust gas 13 recycled from the mill 126 to the rotary apparatus 100, the amount of gas 12 necessary to maintain optimal flow and energy capacity may be reduced accordingly. Through recycling of exhaust gases 13, an amount of the off-gases vented to the atmosphere can be minimized. Finely grinded/pulverized petcoke 14 produced in the mill 126 is used as a fuel in the clinkerization/sintering process implemented in the kiln 118, in calcination 116 and/or any other process within the cement production facility (not shown).

The mill 126 may form a part of the cement manufacturing facility 1000. Additionally or alternatively, a separate coking plant for coking coal into coke may be provided outside the cement manufacturing facility 1000 (not shown). Additionally or alternatively, fuel for the kiln 118 and the calciner 116 (stream 14, FIG. 1B) may be produced in a suitable process unit/plant from dried waste, such as municipal solid waste, dried biomass, as well as from fossil derived fuels, such as diesel or heavy gasoil (not shown).

In similar manner, the rotary apparatus 100 may be adapted to provide heat input into preheater 114 for preheating cement raw materials (reactive cement clinker precursors), into a heat recovery unit/a cooler 120 to recover heat from hot burned clinker and cool clinker to intermediate storage. In the invention, the rotary apparatus 100 heats recycle gases and also provides pressure rise as needed for recycling so reducing the need of blowers.

Hot gases 12 produced in the apparatus(es) 100 may be delivered into any one of the units/processes 101 and recycled back to the apparatus(es) 100 as streams 13. By way of example, hot gases from the kiln 118 may be used to heat raw materials in the preheater 114 (recycling path not shown) up to a temperature within a range of about 810° C. to about 830° C. Clinker leaving the kiln 118 at temperatures within a range of about 1200-1250° C. is rapidly cooled in the heat recovery unit/clinker cooler 120, and hot gases recovered in cooling can be further recycled back to the rotary apparatus 100 (recycling path not shown). Target is to recover gases at high temperature and recycle back to the rotary apparatus. Exhaust gases leaving the preheater 114 at a temperature of about 300-360° C. can be also used in the clinker cooler 120 (recycling path not shown). Carbon dioxide-rich waste gases released in the units 101 can be further purified and/or the carbon can be captured from these waste gases and re-used or stored permanently e.g. in underground geological formations (not shown).

In the disclosed facility, it is further possible to recycle at least a part of the waste gases discharged from the heat-consuming processes 101 back into the rotary apparatus (directly or indirectly—i.e. through a number of purification units/heat recovery units). In such an event, the rotary apparatus can be set to heat recycle gases, which contain a significant amount $CO_2$.

It is further noted that FIG. 1B does not show heat exchangers or arrangements typically used for heat recovery. Such arrangements are described with regard to FIG. 3.

Figure 4A:
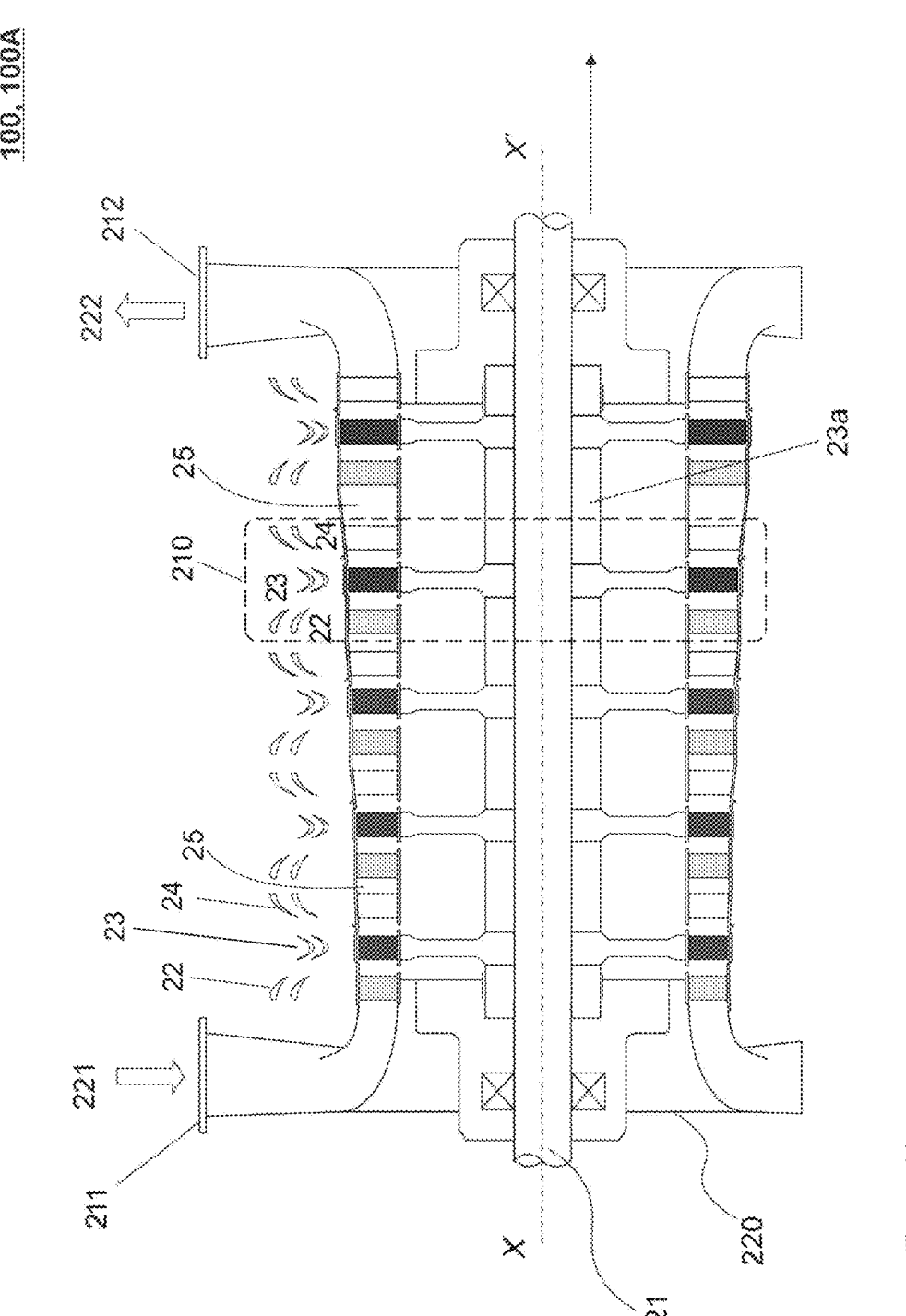
FIGS. 4A-4D are exemplary layouts of arranging rotary apparatus(es) 100 within the cement production facility, according to the embodiments.

The rotary apparatus 100 (rf. FIG. 4A) configured for generating the heated fluidic medium to be supplied into the cement production facility according to the embodiments comprises a rotor comprising a plurality of rotor blades 23 arranged into at least one row over a circumference of a rotor hub 23a or a rotor disk mounted onto a rotor shaft 21 having an axis X-X', and a casing 220 with at least one inlet 211 and at least one outlet 212, the rotor being enclosed within the casing 220. In the apparatus 100, an amount of thermal energy is imparted to a stream of fluidic medium directed along a flow path formed inside the casing between the inlet 211 and the outlet 212 by virtue of a series of energy transformations occurring when said stream of fluidic medium passes through the at least one row of rotor blades 23 when propagating inside the casing 220 of the rotary apparatus 100, between the inlet 211 and the outlet 212, whereby a stream of heated fluidic medium is generated.

Implementation of the rotary apparatus 100 may generally follow the disclosures of a rotary reactor apparatus according to the U.S. Pat. No. 7,232,937 (Bushuev), U.S. Pat. No. 9,494,038 (Bushuev) and U.S. Pat. No. 9,234,140 (Seppala et al), and of a radial reactor apparatus according to the U.S. Pat. No. 10,744,480 (Xu & Rosic), the entire contents of which are incorporated by reference herewith. Any other implementation, which can be configured to adopt the method according to the embodiments, can be utilized.

In the patent documents referenced above, the rotary turbomachine-type apparatuses were designed as reactors for processing hydrocarbons, in particular, for steam cracking. General requirements for these applications are: rapid heating of gases, high temperature, short residence time, and plug flow (a flow model which implies no axial mixing). These requirements have led to designs where the turbomachine type reactors have several heating stages accommodated in a relatively small volume.

The present disclosure is based on an observation that the rotary apparatus (including, but not limited to the ones referenced above) can be electrified and used as a heater to generate the heated fluidic medium further supplied in the heat-consuming process 101, such as a process or processes related to manufacturing of cement. By integration of the rotary apparatus heater unit(s) into the heat-consuming process or processes, significant reductions in greenhouse gas- and particle emissions can be achieved. By way of example, the rotary apparatus can replace fuel-fired heaters in a variety of applications described herein above. The temperature range can be extended from about 1000° C. (generally achievable with the above referenced reactor devices) to up to at least about 1700° C. and further up to 2500° C. Construction of the rotary apparatuses capable of achieving these high temperatures is possible due to an absence of aerodynamic hurdles.

The rotary apparatus 100 integrated into the cement production facility according to the embodiments and configured to generate the heated fluidic medium for the method (s) according to the embodiment thus comprises the rotor shaft positioned along a horizontal (longitudinal) axis with at least one rotor unit mounted onto the rotor shaft. The rotor unit comprises a plurality of rotor (working) blades arranged over the circumference of a rotor hub or a rotor disk and together forming a rotor blade cascade. The rotary apparatus 100 thus comprises a plurality of rotor (working) blades arranged into at least one row over the circumference of a rotor hub or a rotor disk mounted onto the rotor shaft, and forming an essentially annular rotor blade assembly or rotor blade cascade.

In embodiments, the apparatus 100 further comprises a plurality of stationary vanes 22 arranged into an assembly disposed at least upstream of the at least one row of rotor blades 23. In this configuration, the rotary apparatus 100 is operated such that the amount of thermal energy is imparted to a stream of fluidic medium directed along a flow path formed inside the casing 220 between the inlet 211 and the outlet 212 by virtue of a series of energy transformations occurring when said stream of fluidic medium passes through the stationary vanes 22 and the at least one row of rotor blades 23, respectively, whereby a stream of heated fluidic medium is generated.

In some embodiments, the plurality of stationary vanes can be arranged into a stationary vane cascade (a stator), provided as an essentially annular assembly upstream of the at least one row of rotor blades. The stationary vanes arranged into the assembly disposed upstream of the at least one row of rotor blades may be provided as stationary guide vanes, such as (inlet) guiding vanes (IGV), and be configured, in terms of profiles, dimensions and disposition thereof around the central shaft, to direct the fluid flow into the rotor in a predetermined direction such, as to control and, in some instances, to maximize the rotor-specific work input capability.

The rotary apparatus can be configured with two or more essentially annular rows of rotor blades (blade cascades) sequentially arranged on/along the rotor shaft. In such an event, the stationary guide vanes may be installed upstream of the first row of the rotor blades, upstream of each row of rotor blades in the sequence, or upstream of any selected row of rotor blades in a sequential arrangement of the latter.

In embodiments, the rotary apparatus 100 further comprises a diffuser area arranged downstream of the at least one row of rotor blades (rotor blade cascade). In such an event, the rotary apparatus is operated such that an amount of thermal energy is imparted to a stream of fluidic medium directed along a flow path formed inside the casing between the inlet and the exit by virtue of a series of energy transformations occurring when said stream of fluidic medium successively passes through the stationary guide vanes, the at least one row of rotor blades and the diffuser area, respectively, whereby a stream of heated fluidic medium is generated. The diffuser area can be configured with or without stationary diffuser vanes. In some configurations, a vaned or vaneless diffuser is arranged, in said diffuser area, downstream of the at least one rotor blade cascade. In some configurations, the diffuser can be implemented as a plurality of stationary (stator) vanes arranged into a diffuser vane cascade, provided as an essentially annular assembly downstream of the rotor.

The rotor, the stationary guide vanes and the diffuser area are enclosed within an internal passageway (a duct) formed in the casing.

In some configurations, such as described for example in U.S. Pat. No. 10,744,480 to Xu and Rosic, provision of a diffuser (device) may be omitted, and the diffuser area may be represented with an essentially vaneless portion of the duct (a so-called vaneless space) located downstream of the rotor and configured, in terms of its geometry and/or dimensional parameters, to diffuse a high-speed fluid flow arriving from the rotor.

Provision of the vaneless portion 25 of the duct is common for all configurations of the rotary apparatus 100 described above. Depending on configuration, the vaneless portion 25 (vaneless space) is arranged downstream of the rotor blades 23 (rf. U.S. Pat. No. 10,744,480 to Xu and Rosic) or downstream of the diffuser vane cascade 24 (rf. U.S. Pat. No. 9,494,038 to Bushuev and U.S. Pat. No. 9,234,140 to Seppälä et al). In some configuration described for example by Seppälä et al, arrangement of rotating and stationary blade rows in the internal passageway within the casing 220 is such that vaneless portion(s) 25 is/are created between an exit from the stationary diffuser vanes 24 disposed downstream of the rotor blades 23 and an entrance to the stationary guide blades 22 disposed upstream of the rotor blades 23 of a subsequent rotor blade cascade unit.

The terms "upstream" and "downstream" refer hereby to spatial and/or functional arrangement of structural parts or components with relation to a predetermined part- or component, hereby, the rotor, in a direction of fluidic flow stream throughout the apparatus (from inlet to exit).

Overall, the rotor with the working blade cascade can be positioned between the rows of stationary (stator) vanes arranged into essentially annular assemblies (referred to as cascades) at one or both sides of the working blade row.

Configurations including two or more rows of rotor blades/rotor blade cascades arranged in series (in sequence) on/along the rotor shaft may be conceived with or without stationary blades in between. In an absence of stationary vanes between the rotor blade rows, the speed of fluidic medium propagating through the duct increases in each subsequent row. In such an event, a plurality of stationary vanes may be arranged into assemblies upstream of a first rotor blade cascade in said sequence (as stationary guide vanes) and downstream of a last most rotor blade cascade (as stationary diffuser vanes).

The row of rotor blades 23 (rotor blade cascade) and a portion of the duct downstream said rotor blades 23 enclosed inside the casing 220 optionally provided with an assembly of stationary diffuser vanes 24 (diffuser area) may be viewed as a minimal process stage 210 (hereafter, the stage 210), configured to mediate a complete energy conversion cycle. Hence, an amount of kinetic energy added to the stream of fluidic medium by at least one row of rotating blades is sufficient to raise the temperature of the fluidic medium to a predetermined value when said stream of fluidic medium exits the rotor blades 23 and propagates, in the duct, towards a subsequent row of rotor blades 23, or enters the same row of rotor blades following an essentially helical trajectory formed within the essentially toroidal-shaped casing. The duct (which encloses the periphery of the rotor) is preferably shaped such, that upon propagation of the fluidic stream in the duct, the stream decelerates and dissipates kinetic energy into an internal energy of the fluidic medium, and an amount of thermal energy is added to the stream of fluidic medium.

The stationary guide blade row(s) disposed upstream of the at least one row of rotor blades prepare required flow conditions at the entrance of the rotating blade row (cascade) during the energy conversion cycle.

In some configurations, the process stage is established with the assembly of stationary guide vanes (upstream of the rotor blades), the row of rotor blades and the diffuser area arranged downstream of said rotor blades, the diffuser area provided as the essentially vaneless portion of the duct optionally supplied with diffuser vanes. During the energy conversion cycle, enabled with successive propagation of the stream of fluidic medium through the stationary guide vanes, the at least one row of rotor blades and the diffuser area, respectively, in a controlled manner, mechanical energy of the rotor shaft is converted into kinetic energy and further—into internal energy of the fluid, followed by the rise of fluid temperature. An amount of kinetic energy added to the stream of fluidic medium by rotating blades of the rotor is sufficient to raise the temperature of the fluidic medium to a predetermined value when said stream of fluidic medium exits the rotor blades and passes, inside n the duct, through the diffuser area, whereupon the stream decelerates and dissipates kinetic energy into an internal energy of the fluidic medium, and an amount of thermal energy is added to the stream of fluidic medium. In the rotor blade row, the flow accelerates, and mechanical energy of the shaft and rotating blades is transferred to fluidic stream. In at least part of each rotor blade row the flow may reach a supersonic flow condition. In the diffuser area, the high-speed fluid flow arriving from the rotor is diffused with the significant entropy increase, whereby the flow dissipates kinetic energy into the internal energy of the fluidic substance, thus providing thermal energy into the fluid. If the flow upstream of the diffuser is supersonic, the kinetic energy of the fluidic stream is converted into internal energy of the fluid through a system of multiple shocks and viscous mixing and dissipation. An increase in the internal energy of the fluid results in a rise of fluid temperature. The energy conversion function may be performed by the vaneless portion of the duct located downstream of the rotor blades (rf. U.S. Pat. No. 10,744,480 to Xu & Rosic) and/or by an assembly of diffusing vanes, for example (rf. U.S. Pat. No. 9,234,140 to Seppala et al).

The rotary apparatus 100 can be configured as a multi-stage- or a single-stage solution. Multistage configurations can be conceived comprising a number of rotor units (e.g. 1-5 rows of rotor blades sequentially arranged on/along the rotor shaft) alternating with common diffuser area(s) (vaneless or vaned).

In an exemplary configuration outlined in U.S. Pat. No. 9,234,140 to Seppälä et al, the rotary apparatus 100 can be implemented substantially in a shape of a ring torus, where a cross-section of the duct in the meridian plane forms a ring-shaped profile. The apparatus comprises a rotor unit disposed between stationary guide vanes (nozzle vanes), and stationary diffusing vanes. The stages are formed with rows of stationary nozzle vanes, rotor blades and diffusing vanes, through which the fluidic stream propagates, in a successive manner, following a flow path established in accordance with an essentially helical trajectory. In this configuration, fluidic stream circulates through the rotating rotor blade cascade a number of times while propagating inside the apparatus between the inlet and the exit. Similar ring-shaped configuration is described in U.S. Pat. No. 9,494,038 to Bushuev.

In another exemplary configuration outlined in U.S. Pat. No. 9,234,140 to Seppälä et al, the rotary apparatus 100 can be configured as an essentially tubular, axial-type turbomachine. In such configuration, the apparatus comprises an extended (elongated) rotor hub, along which a plurality of rotor blades is arranged into a number of sequential rows. The rotor is enclosed within the casing, inner surface of which is provided with the stationary (stator) vanes and diffuser vanes, arranged such that blades/vanes of the stator, rotor- and diffuser cascades alternate along the rotor hub in a longitudinal direction (along the length of the rotor shaft, for inlet to exit). Blades of the rotor cascade at certain position along the rotor in the longitudinal direction form the stage with the adjacent pairs of stationary guide (nozzle) vanes and diffusing vanes, respectively.

In described configurations, the subsequent stages have blade/vane-free space between them.

In still another exemplary configuration outlined in U.S. Pat. No. 10,744,480 to Xu and Rosic, the rotary apparatus 100 can be configured as a radial turbomachine that generally follows a design for centrifugal compressors or centrifugal pumps. The term "centrifugal" implies that fluid flow within the device is radial; therefore, the apparatus may be referred, in the present disclosure, as a "radial-flow apparatus. The apparatus comprises a number of rotor units mounted onto elongated shaft, wherein each rotor unit is preceded with stationary guide vanes. A vaneless portion of the duct shaped in a manner enabling energy conversion (U-bend or S-bend, for example) is located after the rotor unit(s). Additionally, configuration may comprise a separate diffuser device (vaned or vaneless) disposed downstream of the rotor.

In all configurations described above, the rotary apparatus 100 performs, in the method disclosed herein, in similar manner. In operation, the amount of input energy conducted into the at least one rotary apparatus integrated into the heat-consuming process facility is converted into mechanical energy of the rotor. Conditions in the rotary apparatus are adjusted such, as to produce flow rate conditions, at which an amount of kinetic energy added to the stream of fluidic medium by rotating blades of the rotor is sufficient to raise the temperature of the fluidic medium to a predetermined value when said stream of fluidic medium exits the at least one row rotor blades and passes through the duct and/or through the diffuser area to enter the subsequent row of rotor blades or the same row of rotor blades in accordance to the description above. The row(s) of rotor blades may be preceded with stationary guide vanes. Hence, the adjustable condition comprises adjusting at least a flow of fluidic medium propagating inside the casing of the rotary apparatus, between the inlet and the exit. Adjusting the flow may include adjusting such apparatus operation related parameters, as temperature, mass flow rate, pressure, etc. Additionally or alternatively, flow conditions can be adjusted by modifying shape of the duct formed inside the casing.

In some exemplary configurations, the rotary apparatus can be configured to implement a fluidic flow between its inlet(s) and outlet(s) along a flow path established in accordance with any one of: an essentially helical trajectory formed within an essentially toroidal-shaped casing, as discussed in any one of the patent documents U.S. Pat. No. 9,494,038 to Bushuev and U.S. Pat. No. 9,234,140 to Seppälä et al; an essentially helical trajectory formed within an essentially tubular casing, as discussed in the patent document U.S. Pat. No. 9,234,140 to Seppälä et al; an essentially radial trajectory as discussed in the patent document U.S. Pat. No. 10,744,480 to Xu & Rosic; and along the flow path established by virtue of the stream of fluidic medium in the form of two spirals rolled up into vortex rings of right and left directions, as discussed in the patent document U.S. Pat. No. 7,232,937 to Bushuev). The aerodynamic design of the rotary apparatus can vary.

The rotary apparatus utilizes a drive engine. In preferred embodiments, the apparatus utilizes electrical energy as the input energy and is therefore electric motor-driven. For the purposes of the present disclosure, any appropriate type of electric motor (i.e. a device capable of transferring energy from an electrical source to a mechanical load) can be utilized. Suitable coupling(s) arranged between a motor drive shaft and the rotor shaft, as well as various appliances, such as power converters, controllers and the like, are not described herewith. Additionally, the apparatus can be directly driven by gas- or steam turbine, for example, or any other appropriate drive device. In layouts involving parallel connection of a number of rotary apparatuses 100 to a common heat-consuming unit 101, such as a furnace, for example, one or more of said apparatuses may utilize different type of drive engine, e.g. the electric motor driven apparatuses can be combined with those driven by steam turbine, gas turbine and/or gas engine.

Electric power (defined as the rate of energy transfer per unit time) can be supplied into the rotary apparatus through supplying electric current to the electric motor used to propel a rotary shaft of the apparatus. Supply of electric power into the rotary apparatus can be implemented from an external source or sources (as related to the rotary heater unit/the apparatus 100 and/or the heat-consuming process facility 1000). Additionally or alternatively, electrical energy can be produced internally, within the facility 1000.

An external source or sources include a variety of supporting facilities rendered for sustainable energy production. Thus, electric power can be supplied from an electricity generating system that exploits at least one source of renewable energy or a combination of the electricity generating systems exploiting different sources of renewable energy. External sources of renewable energy can be provided as solar, wind- and/or hydropower. Thus, electric power may be received into the process from at least one of the following units: a photovoltaic electricity generating system, a wind-powered electricity generating system, and a hydroelectric power system. In some exemplary instances, a nuclear power plant may be provided as the external source of electrical power. Nuclear power plants are generally regarded as emission-free. The term "nuclear power plant" should be interpreted as using traditional nuclear power and, additionally or alternatively, fusion power.

Electricity can be supplied from a power plant that utilizes a turbine as a kinetic energy source to drive electricity generators. In some instances, electric power to drive the at least one apparatus 100 can be supplied from at least one gas turbine (GT) provided as a separate installation or within a cogeneration facility and/or a combined cycle power facility, for example. Electric power can thus be supplied from at least one of the following units: a combined cycle power facility, such as a combined cycle gas turbine plant (CCGT), and/or a cogeneration facility configured for electricity production combined with heat recovery and utilization through combined heat and power (CHP), for example. In some examples, the CHP plant can be a biomass fired plant to increase the share of renewable energy in the process described. Additionally or alternatively, supply of electric power can be realized from a spark ignition engine, such as a gas engine, for example, and/or a compression engine, such as a diesel engine, for example, optionally provided as a part of an engine power plant. Still further, any conventional power plant configured to produce electrical energy from fossil raw materials, such as coal, oil, natural gas, gasoline, and the like, typically mediated with the use of steam turbines, can be used to generate electrical energy as an input energy for the rotary apparatus 100. Also hydrogen can be utilized as a source of renewable energy, to be reconverted into electricity, for example, using fuel cells.

Any combination of the abovementioned sources of electric power, realized as external and internal sources, may be conceived. Importing low emission electric power from an alternative (external) source improves energy efficiency of the heat-consuming process facility.

Conducting input energy, comprising electrical power, into a drive engine of the rotary apparatus can be further accompanied with conducting mechanical shaft power thereto from a power turbine, for example, optionally utilizing thermal energy generated elsewhere in the facility 1000 or outside said facility. Shaft power is defined as mechanical power transmitted from one rotating element to another and calculated as a sum of the torque and the speed of rotation of the shaft. Mechanical power is defined, in turn, as an amount of work or energy per unit time (measured in Watt).

In practice, the shaft power from the electric motor and the power turbine, for example, can be divided so that any one of those can provide the full shaft power or a fraction of it.

FIG. 3 is block diagram representing, at 1000, a layout for a high temperature heat-consuming process facility configured to implement a method according to the embodiments. The heat consuming process 101 may be any process related to cement manufacturing and described with regard to FIGS. 1A and 1B. Block diagram sections shown by dotted lines are optional. The layout shown on FIG. 3 may thus be applied, in its entirety, to any one of the process units 101 shown on FIGS. 1A and 1B. Necessary modifications may be introduced depending on a nature of the heat-consuming process 101.

The rotary apparatus 100 is configured to receive a feed stream 31, hereafter, the feed 31. Overall, the feed 31 can comprise or consist of any fluid, such as liquid or gas or a combination thereof, provided as a pure component or a mixture of components. The feed can be a feedstock gas, a process gas, a make-up gas (a so-called replacement/supplement gas), and the like. Gaseous feed can include inert gases (air, nitrogen gas, and the like) or reactive, e.g. oxygen, flammable gases, such as hydrocarbons, or any other gas like hydrogen and ammonia. Selection of the feed is process-dependent; that is, the nature of the heat-consuming process 101 (and indeed a specific industry/an area of industry said heat-consuming process 101 is assigned to) implies certain requirements and/or limitations on the selection of feed substance(s). Therefore, in the manufacture of cement, the feed 31 is typically air or a combination of air and additional oxygen and/or combustion fuel. In some instances (water) steam can be utilized. Other oxygen-free gases, such as for example nitrogen ($N_2$), hydrogen ($H_2$), carbon dioxide ($CO_2$), carbon monoxide (CO), and methane ($CH_4$) can be utilized. Carbon oxides can be used to an extent that their concentration in the feed gas does not affect calcination reactions in the (pre) calciner 116.

It is preferred that the feed 31 enters the apparatus 100 in essentially gaseous form. Preheating of the feed or conversion of liquid or essentially liquid feed(s) into a gaseous form can be performed in an optional preheater unit 102 configured as a (pre) heater apparatus or a group of apparatuses. In the preheater unit 102, the feed stream(s) originally provided in a gaseous form (e.g. the process gas or gases) can be further heated (e.g. superheated). In the preheater unit 102, the feed 31 can be vaporized if not already in gas form and optionally superheated.

The preheater unit 102 can be any conventional device/system configured to provide heat to fluidic substance. In some configurations, the preheater unit 102 can be a fired heater (viz. a direct-fired heat exchanger that uses hot combustion gases (flue gases) to raise the temperature of a fluidic feed, such as a process fluid, flowing through the coils arranged inside the heater). Additionally or alternatively, the preheater unit 102 can be configured to exploit energy made available by the other units in the heat-consuming facility (for example by extracting thermal energy from hot stream 313 arriving from heat recovery). The preheater unit 102 can thus be configured to utilize other steam streams, as well as electricity and/or waste heat streams (not shown).

Depending on a heat-consuming process and related equipment, which in this embodiment is cement production, the feed stream 31 used to produce the heated fluidic medium, such as air, by virtue of the rotary heater unit (the apparatus 100) comprises a virgin feed (fresh feed) and/or recycle stream(s). Hence, the feed 31 may consist of any one of fresh feed, recycle (fluidic) stream, and a mixture thereof. Stream 32 representing (pre) heated feed may include, in addition to feed 31, all recycle streams, such as those arriving from a purification section 105 and/or a heat recovery section 104.

In the rotary heater unit/the rotary apparatus 100, the temperature is raised to a level which is required by the heat-consuming process 101 or to a maximum level achieved by the rotary apparatus. In an event the temperature rise achieved by the rotary apparatus 100 is not sufficient for the heat-consuming process and/or if, for example, the temperature of the fluid needs to be raised again after it has transferred its heat to the heat-consuming process, further temperature rise can be achieved by virtue of arranging additional heater units (100B, 103), further referred to as "booster" heater(s), downstream of the rotary heater unit 100 (100A); rf. description to FIG. 4B. Each additional heater unit comprises or consists of an additional heating apparatus implemented according to the description below.

Heat recovery section is indicated on FIG. 3 with ref no. 104. Recovered heat can be further used for heating the feed stream 31 and/or a recycle stream (separate recycle stream is indicated on FIG. 3 with ref no. 311).

Heat recovery may be arranged through collecting gases exiting the process unit 101 and recycling these gases to the preheater unit 102 and/or the rotary apparatus 100. The heat recovery installation 104 may be represented with at least one heat exchanger device (not shown). Heat exchangers based on any appropriate technology can be utilized. Heat recovery may be optional for heating feed gas if the heat is consumed elsewhere or if it is not possible to recover heat due to safety- or any other reason.

In the facility layout 1000, the heat recovery unit 104 can be arranged before and/or after the preheater 102. In the latter configuration, the heat recovery unit 104 is arranged to recover heat from the hot fluidic medium (stream 35) flowing from the cement manufacturing process 101, which may be further utilized to heat the feed stream 31 and recycle stream 311. On the other hand, when the heat recovery unit 104 is arranged before the preheater 102, the feed 31 is first led to the unit 104 (as stream 312) and then returned to preheating 102 as stream 313. In such a case, unit 104 acts as a first preheater.

In some instances, gases require purification, e.g. from dust and fine particles, before being directed to heat recovery. Purification can be done by a series of filters, for example, arranged before the heat recovery section 104 (not shown). Additionally or alternatively the gases exiting the process unit 101 may be directed to a purification unit 105 (bypassing the unit 104), and, after purification, returned to the heat recovery (not shown).

Process gas may contain in addition to valuable products also unwanted impurities and side products which may accumulate or/and be harmful for heater apparatus(-es) 100, 103 and/or the process units 101. Purification and separation of streams discharged from heat-consuming processes 101 is performed in the purification unit 105. Unit 105 can comprise a number of appliances, such as filters, cyclones etc., adapted to mechanically remove dust and solid particles. Any conventional purification/separation methods and devices may be utilized. Exemplary purification/separation methods include, but are not limited to: cryogenic separation methods, membrane processes, Pressure Swing Adsorption (PSA), distillation, absorption, and any combination of these methods. The unit 105 may also comprise device configured to increase gas pressure by compression, for example. Typically, purification units 105 operate at lower temperatures than process units 101; therefore, prior to entering the purification unit, a product gas stream is cooled down (in the heat recovery 104, for example). To minimize the extent of deterioration of reactor beds in 101, it is also important to control composition of the recycle gas 311.

Purification unit 105 can be further adapted to purify waste gas(es), e.g. carbon dioxide, for further carbon capture. Waste gases discharged from the cement production facility as stream 37 (FIG. 3) can thus be further directed to carbon capture (not shown). Suitable methods for purification of waste gases include for example PSA, distillation, absorption, etc.

Heated fluidic medium required for carrying out the heat-consuming process(es) 101 is generated by virtue of at least one rotary apparatus 100.

In an embodiment, the heated fluidic medium is generated in the rotary apparatus 100, where an amount of thermal energy is added directly into fluidic medium propagated through said apparatus. In such an event, the heated fluidic medium generated in the rotary apparatus may be for example a process gas, such as a hydrocarbon-containing gas.

In cement manufacturing, the heated fluidic medium generated in the rotary apparatus is typically used as a carrier to transfer thermal energy to the heat-consuming unit 101 configured to implement or mediate a heat-consuming process or processes (101). For example, an inert gas such as air, nitrogen or steam (H2O) can be heated in the rotary apparatus 100 and further used to convey the heat generated by the rotary apparatus to the furnace adapted to perform the process 101 related to manufacturing of cement. In this regard, generation of a heated medium (e.g. fluidic or solid streams exploited by the process 101) can be performed outside the rotary apparatus through a process of heat transfer between the heated fluidic medium generated in the rotary apparatus and a suitable medium exploited by the process 101 and thus bypassing the rotary apparatus. FIG. 3 thus shows stream 39 (a process stream) bypassing the rotary apparatus 100 and designating, in present context, the feed/process stream (e.g. a cement raw material, such as limestone, a cement clinker, a cement product, and/or coke), while streams 31-34 arriving to the process unit 101 via the rotary heater 100 designate fluidic medium (e.g. air, nitrogen, steam, carbon dioxide containing gas or other heating media) directed to the process unit 101 for heating the "cold" process stream 39. Use of inert hot gases as heating media in indirect heating applications may be preferred when the process streams to be heated are at high pressure or under vacuum. Stream 310 represents a "hot" process stream and/or a product stream, respectively. In an event the unit 101 is the clinkerization kiln (118, FIGS. 1A, 1B), stream 310 represents the cement clinker (directed, on FIG. 1B to the unit 120 for cooling), while stream 35 represents, in turn, a stream of (inert) fluidic medium (same as 31-34) exiting the unit/process 101. In indirect heating, streams 39 and 310 relate to a working- or process fluid, whereas streams 31-35 represent a heat-transfer medium. Hence, in indirect heating, the unit 101 acts as a "heat-exchanger" type of device which enables transfer of thermal energy between two fluids flowing therethrough without any direct contact between said fluids.

FIGS. 4A-4D show exemplary layouts for the rotary apparatus 100 with regard to the heat-consuming unit/process 101.

FIG. 4A generally follows the implementation setup schematically presented on FIG. 2B. FIG. 4A illustrates a basic implementation for the rotary apparatus 100, 100A configured to input heat into a stream of fluidic medium (feed stream 221) directed through an inlet 23. Heated stream exiting the apparatus 100 through outlet 24 is designated with reference number 222, respectively. In basic implementation, the rotor system of the rotary apparatus 100 is aerodynamically configured so that a volume of fluid is heated to a predetermined temperature while propagating along the flow path formed in the casing of the apparatus 100, between inlet and exit (so called "one-pass" implementation). The apparatus 100 enables temperature rise (delta T, ΔT) within a range of about 10° C. to about 120° C., in some configurations-up to about 500° C., in one stage. Hence, in case of a multistage implementation, the fluid can be heated to 1000° C. in "one-pass" implementation (taken 100° C. temperature rise per stage in a 10-stage apparatus). Since residence time the fluidic medium spends to pass through the apparatus stage is in scale of fractions of seconds, such as about 0.01-1.0 milliseconds, fast and efficient heating can be achieved already in the basic configuration. Temperature rise can be optimized as required.

Figure 4B:
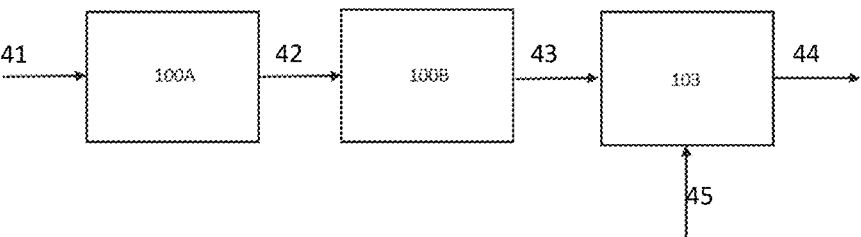

FIG. 4B illustrates a basic concept involving so-called booster heating. Booster heating is an optional method to heat a fluidic medium, such as a process gas, for example, beyond capability of a standalone heater apparatus 100.

Temperature boost may be viewed as thermal, chemical or both. In a first configuration (a) also referred to as a "thermal boost", an additional rotary heater apparatus (designated as 100B on FIGS. 4B, 4C and 4D) is arranged downstream of a "primary" rotary heater apparatus (designated as 100A on FIGS. 4B, 4C and 4D). Apparatuses 100A, 100B are generally recognized, within the present disclosure, as rotary heater units 100. Generation of the heated fluidic medium is can thus be achieved by provision of at least two sequentially connected rotary apparatuses 100A, 100B, wherein the stream of fluidic medium (rf. feed streams 41, 51, 61) is heated to a predetermined temperature in at least a first rotary apparatus (100A) in a sequence, referred to hereby as a primary heater, and wherein said stream of fluidic medium (rf. streams 42, 52, 62) is further heated in at least a second rotary apparatus (100B) in the sequence by inputting an additional amount of thermal energy into the stream of fluidic medium "preheated" in the first rotary apparatus 100A and propagating through the second rotary apparatus 100B (rf. streams 43, 53, 63). The apparatus 100B is therefore referred to as a booster heater. The apparatuses 100A, 100B may be identical and vary in terms of size or internal design. A sequence of two or more booster apparatuses such as 100B can be arranged after a primary heater 100A. Booster apparatuses can be arranged in parallel or in series, or in any combination that allows for optimization of rotating speed and aerodynamics thereof.

In a second, additional or alternative, configuration (further referred to as "chemical boost"), the additional heating apparatus designated as 103 (FIGS. 3, 4B) is adapted to receive, into the stream of fluidic medium propagating therethrough, reactive components 38 (FIG. 3) or 45 (FIG. 4B), such as for example combustible fuel, to provide heat by exothermic reactions prior to directing said stream of fluidic medium to the heat-consuming process 101 of cement manufacturing. In this configuration, temperature boosting can be achieved by virtue of introducing (e.g. by injecting) a reactive chemical or chemicals 38 (FIG. 3) or 45 (FIG. 4B) into to the stream of fluidic medium directed through the additional heater unit/heating apparatus 103.

The reactive chemical-based booster heater unit 103 may be located after the thermal booster heater unit 100, 100B (FIG. 4B) or directly after the primary heater 100, 100A (FIG. 3). The reactive chemical (reactant) 38 (FIG. 3) or 45 (FIG. 4B) may include combustion gases, such as hydrogen gas, hydrocarbons, ammonia, oxygen, air, other gas and/or any other appropriate reactive compound, optionally a catalyst. In the unit 103, by virtue of exothermic reactions, the fluidic stream can be heated to a level, which is typically not possible to achieve by a single rotary apparatus not involving chemical-mediated heating (rf. streams 34, 44). For example, a fuel gas, such as hydrogen, can be introduced into an oxygen-containing process gas, such as air. At elevated temperatures, hydrogen and oxygen enter an exothermic reaction to produce water molecules (hydrogen combustion).

Fuel gas can be injected into the booster heater unit 103 through burners along with air (or enriched oxygen) to rise the temperature of gases. If heated gas contains flammable gases and it is possible to consume these gases for heating only air/or oxygen can be added. Process gases can contain $H_2$, $NH_3$, CO, fuel gases (methane, propane, etc.) which may be burned to generate heat. Other reactive gases can be injected to generate heat if feasible.

The additional heater 103 adapted for chemical boost may be configured as a piece of pipe or as a chamber where exothermic reactions take place, and/or it can comprise as at least one rotary apparatus 100 arranged to receive reactive compounds to accommodate exothermic reactions to produce additional heat energy. The booster section 103 can thus comprise at least one rotary apparatus 100. Optionally, the reactive chemicals can be injected directly to the heat consuming process 101 (not shown). Additionally or alternatively, the reactive chemical mediated boost can be implemented in a single apparatus 100, 103, modified accordingly.

In an arrangement involving booster heating, the temperature of the stream of fluidic medium preheated to a predetermined temperature in a first rotary apparatus (100A) can be further raised to a maximum limit in subsequent heater units (100B, 103). By way of example, the temperature of the stream of fluidic medium preheated to about 1700° C. in a primary heater (100A) can be further raised in subsequent heater units (100B, 103) up to 2500° C. and beyond.

Mentioned concepts can be used separately or in combination, so that the reactive chemical 38 (FIG. 3) or 45 (FIG. 4B) can be introduced into any one of the apparatuses 100 connected in parallel or in series (in sequence). Provision of the booster heater(s) is optional.

In additional or alternative configurations, preheating and additional heating can be implemented in the same apparatus 100 (not shown). This can be achieved in multistage configurations, comprising a number of rotor units (e.g. 1-5 rows of rotor blades sequentially arranged on/along the rotor shaft) alternating with common diffuser area(s) (vaneless or vaned).

Additionally or alternatively, booster heating can be used for example in an event, when the temperature of the fluid once heated in the rotary apparatus(es) 100, needs to be raised again after it has transferred its heat to the heat-consuming process 101 (not shown).

Figure 4C:
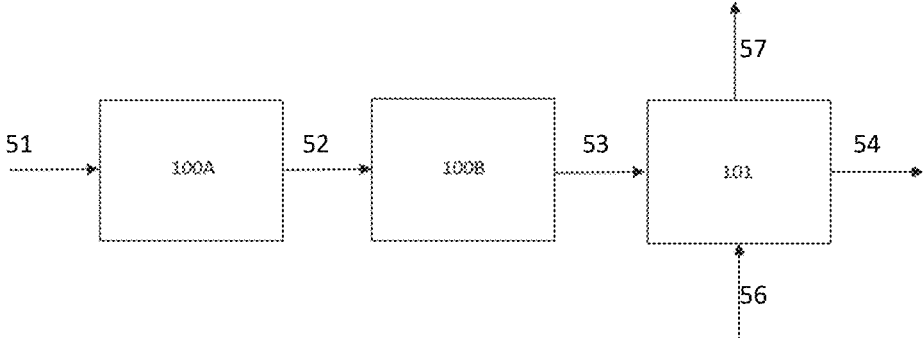
Figure 4D:
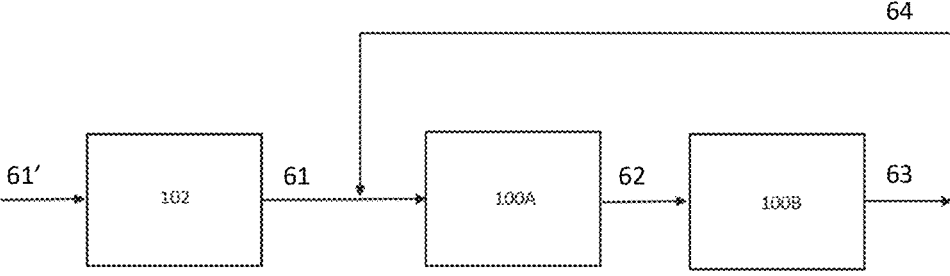

Upon connecting the at least two rotary apparatuses, such as 100A, 100B, and optionally 103 (in an event 103 is implemented as a rotary apparatus 100) in parallel or in series, a rotary apparatus assembly can be established (see for example FIGS. 4B-4D). Connection between the rotary apparatuses 100 implemented as "primary" heater(s) 100A or "booster" heater(s) 100B, 103 can be mechanical and/or functional. Functional (in terms of achievable heat input, for example) connection can be established upon association between at least two individual, physically integrated- or non-integrated individual apparatus units. In a latter case, association between the at least two rotary apparatuses can be established via a number of auxiliary installations (not shown). In some configurations, the assembly comprises the at least two apparatuses connected such, as to mirror each other, whereby said at least two apparatuses are at least functionally connected via their central (rotor) shafts. Such mirrored configuration can be further defined as having the at least two rotary apparatuses 100 mechanically connected in series (in a sequence), whereas functional connection can be viewed as connection in parallel (in arrays). In some instances, the aforesaid "mirrored" arrangement can be further modified to comprise at least two inlets and a common exhaust (discharge) module placed essentially in the center of the arrangement.

Rotary apparatuses (100A, 100B, 103, rf. FIG. 4B) can be assembled on the same (rotor) shaft. Each rotary apparatus can be optionally provided with a separate drive (a motor)

which allows independent optimization of the apparatuses. When two or more separate rotary apparatuses are used, construction costs (materials etc.) can be optimized in view of operation temperature and pressure.

Additionally or alternatively, at least one rotary apparatus within the assembly can be designed to increase pressure of the fluidic stream. Hence, the at least one rotary apparatus in the assembly can be assigned with a combined heater and blower functionality.

Additionally or alternatively, a stream containing reactive or inert gases (such as stream 38 of FIG. 3) can be fed to the rotary apparatus 100 (not shown) or to any equipment downstream of said apparatus (e.g. into the heat-consuming process section 101). Thus, the reactive gases (such as stream 38 of FIG. 3) may be injected directly to the heat-consuming process unit 101, if the latter is configured to receive such chemicals.

FIG. 4C illustrates the use of the rotary heater apparatuses 100A, optionally 100B with indirect process heating. The rotary apparatus 100 (100A, 100B) can be used for indirect heating of fluids in the heat-consuming unit 101, wherein heat is transferred between two non-mixing fluids as in heat exchanger-type configurations. Hence, fluids, such as gases or liquids, can be evaporated (vaporized) or superheated in a feasible heat exchanger arrangement 101 against fluid heated in the rotary apparatus 100. The heat-consuming unit 101 configured to accommodate a heat-consuming process can be represented with any (existing) fired heater, reactor or furnace, or any conventional heat exchanger device. Type of said "heat exchanger" configuration (101) can be selected as needed for optimal heat transfer. Heating gas (see streams 51-53) can be selected to be most suitable for heating and safety (for example: steam, $N_2$, air). Gas heated in the rotary apparatus 100A, 100B can be close to atmospheric pressure or pressure can be raised to improve heat transfer. Heat transfer medium 53 heated in the apparatus 100 (rf. stream 53 exiting 100B) is directed to the heat-consuming process 101, where heat is transferred from stream 53 to a "cold" process stream 56 to produce a "hot" process stream 57. Stream 54 designates the heat transfer medium outflow, respectively.

Process streams 56 and 57 of FIG. 4C thus correspond to streams 39 and 310 of FIG. 3, respectively (indirect heating configuration); while heat transfer medium streams 53 and 54 of FIG. 4C correspond to streams 33 (optionally 34) and 35, respectively (indirect heating configuration).

FIG. 4D illustrates the rotary heater apparatus 100A with a preheater 102 and with a recycle process fluid (stream 64) recycled from the heat consuming process (not shown). Preheater can be electric, fired, combustion engine, gas turbine, etc. or it can be a heat exchanger for recovering excess heat from any high temperature flow in the process. Provision of the preheater 102 is optional. The concept can further include an optional booster heater 100B downstream of the apparatus 100A. Thermal or chemical booster heating may be utilized. Stream 61' designates a (feed) fluid sent to the preheater 102. Said fluid is further propagated through the rotary apparatuses 100A, 100B, where the feed is heated and sent to the heat-consuming process at stream 63.

Any one of the rotary apparatuses 100A, 100B can be equipped with a fluid recycle arrangement (see stream 64, FIG. 4D). Any combination of the rotary apparatuses the fluid recycle arrangement can be conceived. Recycling is made possible through recirculation of the streams of fluidic medium by the at least one rotary apparatus.

In some configurations, the rotary apparatus 100 can utilize flue gases with low oxygen content exhausted from a conventional fired heater. In such an event, hot flue gases exhausted from the fired heater are mixed with recycle gases (stream 64, FIG. 4D) to be used for heating in the rotary heater 100, 100A. Oxygen content in the flue gases used in described case is preferably below a flammability limit to provide safe heating.

It is clear to a person skilled in the art that with the advancement of technology the basic ideas of the present invention may be implemented and combined in various ways. The invention and its embodiments are thus not limited to the examples described herein above, instead they may generally vary within the scope of the appended claims.

The invention claimed is:

1. A method for cement production, the method comprising generation of a heated fluidic medium by at least one rotary apparatus integrated into a cement production facility, the at least one rotary apparatus comprising:

a casing with at least one inlet and at least one exit, a rotor comprising at least one row of rotor blades arranged over a circumference of a rotor hub mounted onto a rotor shaft, and a plurality of stationary vanes arranged into an assembly upstream of the at least one row of rotor blades, wherein an amount of thermal energy is imparted to a stream of fluidic medium directed along a flow path formed inside the casing between the inlet and the exit by virtue of a series of energy transformations occurring when said stream of fluidic medium passes through the stationary vanes and the at least one row of rotor blades, respectively, whereby a stream of heated fluidic medium is generated, the method further comprising:

conducting an amount of input energy into the at least one rotary apparatus integrated into the cement production facility, the input energy comprising electrical energy, generating a stream of heated fluidic medium in the rotary apparatus, supplying the stream of heated fluidic medium generated by the at least one rotary apparatus into the cement production facility, and operating said at least one rotary apparatus and said cement production facility to carry out cement production at temperatures equal to or exceeding 500 degrees Celsius (° C.), wherein the stream of heated fluidic medium generated in the rotary apparatus is a recycle gas recycled from exhaust gases generated in the process or processes related to production of cement.

2. The method of claim 1, wherein, in the cement production facility, the at least one rotary apparatus is connected to and/or integrated into at least one heat-consuming unit configured to carry out a process or processes related to cement production.

3. The method of claim 2, wherein, in the cement production facility, the at least one heat-consuming unit to which the at least one rotary apparatus is connected to and/or integrated into is any one of: (i) a clinkerization unit configured for thermal conversion of cement raw materials into cement clinker, (ii) a heater and/or a dryer configured for heating and/or drying a cement raw material, a cement clinker and/or a cement product, (iii) a mixer and/or a homogenizer configured to act on any one of a cement raw material, a cement clinker and/or a cement product, (iv) post-clinkerization processing unit(s) configured for cooling cement clinker and/or for formation of a cement product, (v) a mill configured for drying and grinding solid fuels, or (vi) any combination thereof.

4. The method of claim 2, wherein, in the cement production facility, the heat-consuming unit to which the at least one rotary apparatus is connected to is at least one kiln configured to thermally convert cement raw materials into cement clinker.

5. The method of claim 1, comprising generation of the fluidic medium heated to the temperature equal to or exceeding 500 degrees Celsius (C).

6. The method of claim 1, comprising adjusting velocity and/or pressure of the stream of fluidic medium propagating through the rotary apparatus, to produce conditions at which the stream of the heated fluidic medium is generated.

7. The method of claim 1, in which the heated fluidic medium is generated by at least one rotary apparatus comprising two or more rows of rotor blades sequentially arranged along the rotor shaft.

8. The method of claim 1, in which the heated fluidic medium is generated by at least one rotary apparatus further comprising a diffuser area arranged downstream of the at least one row of rotor blades, the method comprises operating the at least one rotary apparatus integrated into the cement production facility such, that an amount of thermal energy is imparted to a stream of fluidic medium directed along a flow path formed inside the casing between the inlet and the exit by virtue of a series of energy transformations occurring when said stream of fluidic medium successively passes through the stationary vanes, the rotor blades and the diffuser area, respectively, whereby a stream of heated fluidic medium is generated.

9. The method of claim 8, wherein, in said rotary apparatus, the diffuser area is further configured with stationary diffuser vanes.

10. The method of claim 1, in which the amount of thermal energy added to the stream of fluidic medium propagating through the rotary apparatus is controlled by adjusting the amount of input energy conducted into the at least one rotary apparatus integrated into the cement production facility.

11. The method of claim 1, further comprising arranging an additional heating apparatus downstream of the at least one rotary apparatus and introducing a reactive compound or a mixture of reactive compounds to the stream of fluidic medium propagating through said additional heating apparatus, whereupon an additional amount of thermal energy is added to said stream of fluidic medium through exothermic reaction(s).

12. The method of claim 11, wherein the reactive compound or the mixture of reactive compounds is introduced to the stream of fluidic medium preheated to a predetermined temperature.

13. The method of claim 12, wherein the reactive compound or the mixture of reactive compounds is introduced to the stream of fluidic medium preheated to a temperature essentially equal to or exceeding 1700° C.

14. The method of claim 12, wherein preheating of the stream of fluidic medium to the predetermined temperature is implemented in the rotary apparatus.

15. The method of claim 1, comprising generation of the heated fluidic medium by at least two rotary apparatuses integrated into the cement production facility, wherein the at least two rotary apparatuses are connected in parallel or in series.

16. The method of claim 15, comprising generation of the heated fluidic medium by at least two sequentially connected rotary apparatuses, wherein the stream of fluidic medium is preheated to a predetermined temperature in at least a first rotary apparatus in a sequence, and wherein said stream of fluidic medium is further heated in at least a second rotary apparatus in the sequence by inputting an additional amount of thermal energy into the stream of preheated fluidic medium propagating through said second rotary apparatus.

17. The method of claim 16, wherein, in at least the first rotary apparatus in the sequence, the stream of fluidic medium is preheated to a temperature equal to or exceeding 1700° C.

18. The method of claim 16, wherein the additional amount of thermal energy is added to the stream of fluidic medium propagating through said at least second rotary apparatus in the sequence by virtue of introducing a reactive compound or a mixture of reactive compounds into said stream.

19. The method of claim 1, comprising introducing a reactive compound or a mixture of reactive compounds into a process or processes related to the production of cement.

20. The method of claim 1, wherein the fluidic medium that enters the rotary apparatus is a gaseous medium.

21. The method of claim 1, wherein the heated fluidic medium generated in the rotary apparatus comprises any one of: air, steam ($H_2O$), nitrogen ($N_2$), hydrogen ($H_2$), carbon dioxide ($CO_2$), carbon monoxide (CO), methane ($CH_4$), or any combination thereof.

22. The method of claim 1, further comprising generation of the heated fluidic medium and/or heated solid materials outside the rotary apparatus through a process of heat transfer between the heated fluidic medium generated in the rotary apparatus and any one of the above-mentioned substances bypassing the rotary apparatus.

23. The method of claim 1, wherein the heated fluidic medium generated by the at least one rotary apparatus is supplied into at least one heat-consuming unit within the cement production facility, the heat-consuming unit provided as any one of: (i) a clinkerization unit configured for thermal conversion of cement raw materials into cement clinker, (ii) a heater and/or a dryer configured for heating and/or drying a cement raw material, a cement clinker and/or a cement product, (iii) a mixer and/or a homogenizer configured to act on any one of a cement raw material, a cement clinker and/or a cement product, (iv) post-clinkerization processing unit(s) configured for cooling cement clinker and/or for formation of a cement product, (v) a mill configured for drying and grinding solid fuels, or (vi) any combination thereof.

24. The method of claim 1, wherein the heated fluidic medium generated by the at least one rotary apparatus is further supplied into at least one heat-consuming unit within the cement production facility, the at least one heat-consuming unit being provided as any one of: a burner, a furnace, an oven, a reactor, an incinerator, a combustion chamber, a boiler, a conveyor device, or a combination thereof.

25. The method of claim 1, further comprising increasing pressure in the stream of fluidic medium propagating through the rotary apparatus.

26. The method of claim 1, in which the amount of electrical energy conducted as the input energy into the at least one rotary apparatus integrated in the cement production facility is within a range of 5 percent to 100 percent of a total energy input.

27. The method of claim 1, wherein the amount of electrical energy conducted as the input energy into the at least one rotary apparatus integrated in the cement production facility is obtainable from a source of renewable energy or a combination of different sources of energy, optionally, renewable energy.

28. The method of claim 1, wherein the at least one rotary apparatus is utilized to balance variations in the amount of electrical energy, optionally renewable electrical energy, by virtue of being integrated into the cement production facility, together with an at least one non-electrical energy operable heater device.

29. The method of claim 1, wherein energy efficiency of the cement production facility is improved and/or wherein greenhouse gas and particle emissions in the cement production facility are reduced.

30. A cement production facility configured to implement a process or processes related to cement production through a method as defined in claim 1.

31. A cement production facility comprising at least one rotary apparatus configured to generate a heated fluidic medium and at least one heat-consuming unit configured to carry out a process or processes related to cement production, the at least one rotary apparatus comprising:
   a casing with at least one inlet and at least one exit,
   a rotor comprising at least one row of rotor blades arranged over a circumference of a rotor hub mounted onto a rotor shaft, and
   a plurality of stationary vanes arranged into an assembly at least upstream of the at least one row of rotor blades,
   wherein the at least one rotary apparatus is configured to operate such that an amount of thermal energy is imparted to a stream of fluidic medium directed along a flow path formed inside the casing between the inlet and the exit by virtue of a series of energy transformations occurring when said stream of fluidic medium passes through the stationary vanes and the at least one row of rotor blades, respectively, whereby a stream of heated fluidic medium is generated,
   wherein said at least one rotary apparatus is configured to receive an amount of input energy, the input energy comprising electrical energy, and to generate a heated fluidic medium for inputting thermal energy into at least one heat-consuming unit configured to carry out a process or processes related to cement production at temperatures equal to or exceeding 500 degrees Celsius (° C.), and
   wherein the heated fluidic medium generated in the rotary apparatus is a recycle gas recycled from exhaust gases generated in the process or processes related to production of cement.

32. The cement production facility of claim 31, wherein the at least one heat-consuming unit is any one of: (i) a clinkerization unit configured for thermal conversion of cement raw materials into cement clinker, (ii) a heater and/or a dryer configured for heating and/or drying a cement raw material, a cement clinker and/or a cement product, (iii) a mixer and/or a homogenizer configured to act on any one of a cement raw material, a cement clinker and/or a cement product, (iv) post-clinkerization processing unit(s) configured for cooling cement clinker and/or for formation of a cement product, (v) a mill configured for drying and grinding solid fuels, such as petroleum coke and/or coal, or (vi) any combination thereof, and wherein the at least one rotary apparatus is connected to and/or integrated into any one of (i)-(vi).

33. The cement production facility of claim 31, wherein the heat-consuming unit, to which the at least one rotary apparatus is connected to is at least one kiln configured to convert cement raw materials into cement clinker.

34. The cement production facility of claim 31, in which the at least one rotary apparatus is further connected to a heat-consuming unit configured as any one of: a burner, a furnace, an oven, a reactor, an incinerator, a combustion chamber, a boiler, a conveyor device, or a combination thereof.

35. The cement production facility of claim 31, wherein the at least one rotary apparatus comprises two or more rows of rotor blades sequentially arranged along the rotor shaft.

36. The cement production facility of claim 31, wherein the at least one rotary apparatus further comprises a diffuser area arranged downstream of the at least one row of rotor blades.

37. The cement production facility of claim 36, wherein the diffuser area is further configured with stationary diffuser vanes.

38. The cement production facility of claim 31, wherein the at least one rotary apparatus is further configured to increase pressure in the fluidic stream propagating therethrough.

39. The cement production facility of claim 31, wherein at least two rotary apparatuses are arranged into an assembly and connected in parallel or in series.

40. A method for inputting thermal energy into a process or processes related to producing cement in a cement production facility, the method comprises generation of a heated fluidic medium by at least one rotary apparatus integrated into the cement production facility, the at least one rotary apparatus comprising:

a casing with at least one inlet and at least one exit, a rotor comprising at least one row of rotor blades arranged over a circumference of a rotor hub mounted onto a rotor shaft, and a plurality of stationary vanes arranged into an assembly at least upstream of the at least one row of rotor blades, the method further comprises:

integrating the at least one rotary apparatus into the cement production facility configured to carry out process or processes related to production of cement at temperatures equal to or exceeding 500 degrees Celsius (° C.), conducting an amount of input energy into the at least one rotary apparatus integrated into the cement production facility, the input energy comprising electrical energy, and operating the at least one rotary apparatus integrated into the cement production facility such, that an amount of thermal energy is imparted to a stream of fluidic medium directed along a flow path formed inside the casing between the inlet and the exit by virtue of a series of energy transformations occurring when said stream of fluidic medium passes through the stationary vanes and the at least one row of rotor blades, respectively, whereby a stream of heated fluidic medium is generated, wherein the stream of heated fluidic medium generated in the rotary apparatus is a recycle gas recycled from exhaust gases generated in the process or processes related to production of cement.

41. The method of claim 40, wherein the process related to producing cement in the cement production facility is any one of: (i) a process for thermal conversion of cement raw materials into cement clinker implemented in a clinkerization unit; (ii) a process of heating and/or drying a cement raw material, a cement clinker and/or a cement product implemented in a heater and/or a dryer, (iii) a process of mixing and/or homogenizing of a cement raw material, a cement clinker and/or a cement product implemented in a mixer and/or a homogenizer, (iv) processes for cooling cement clinker and/or for formation of a cement product implemented in post-clinkerization processing unit(s), (v) a process of drying and grinding solid fuels implemented in a mill, or (vi) any combination thereof.

*     *     *     *     *